(12) United States Patent
Aoki et al.

(10) Patent No.: US 7,159,775 B2
(45) Date of Patent: Jan. 9, 2007

(54) TAG READING METHOD AND APPARATUS

(75) Inventors: Nobuhisa Aoki, Kawasaki (JP); Toru Maniwa, Kawasaki (JP); Takeshi Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 10/854,584

(22) Filed: May 26, 2004

(65) Prior Publication Data

US 2005/0133597 A1 Jun. 23, 2005

(30) Foreign Application Priority Data

Dec. 18, 2003 (JP) ............................. 2003-420702

(51) Int. Cl.
*G06K 7/08* (2006.01)
(52) U.S. Cl. ..................... 235/451; 235/439
(58) Field of Classification Search ............. 235/451, 235/439; 340/505, 572.1; 343/795
See application file for complete search history.

(56) References Cited

U.S. PATENT DOCUMENTS

| | | | |
|---|---|---|---|
| 5,936,527 A | 8/1999 | Isaacman et al. | |
| 6,424,838 B1 | 7/2002 | Stobbe et al. | |
| 2003/0057279 A1* | 3/2003 | Uozumi et al. | 235/451 |
| 2004/0195319 A1* | 10/2004 | Forster | 235/385 |

FOREIGN PATENT DOCUMENTS

| | | |
|---|---|---|
| EP | 0 965 857 | 12/1999 |
| JP | 6-3446 | 1/1994 |
| JP | 6-223962 | 8/1994 |
| JP | 11-230734 | 8/1999 |
| JP | 2000-331136 | 11/2000 |
| WO | WO 01/22118 | 3/2001 |
| WO | WO 02/07077 | 1/2002 |

OTHER PUBLICATIONS

Partial European Search Report dated Apr. 29, 2005.
European Search Report dated Jun. 10, 2005.

* cited by examiner

*Primary Examiner*—Michael G. Lee
*Assistant Examiner*—Kristy A. Haupt
(74) *Attorney, Agent, or Firm*—Katten Muchin Rosenman LLP

(57) ABSTRACT

Disclosed in a reading apparatus for supplying power to at least one of a plurality of superimposed RF tags and reading information from the tag while power is being supplied thereto. The apparatus includes means for generating high-frequency signals; electromagnetic wave generating means to which the high-frequency signals are input for generating electromagnetic waves from a plurality of locations, e.g., from both sides of the superimposed tags, by the high-frequency signals and causing the electromagnetic waves to interfere with each other on the tags; means for controlling the phase difference between the high-frequency signals, which are supplied to the electromagnetic wave generating means provided on both sides of the tags, in accordance with the position of a tag from which information is read; and phase shifting means for controlling the phase of at least one high-frequency signal so to produce the phase difference.

20 Claims, 26 Drawing Sheets

FIG. 3

| r [cm] | θ [DEGREES] |
|---:|---:|
| 0.0 | 0 |
| 0.8 | 300 |
| 1.7 | 240 |
| 2.5 | 180 |
| 3.3 | 120 |
| 4.2 | 60 |
| 5.0 | 0 |
| 5.8 | 0 |
| 6.7 | 300 |
| 7.5 | 240 |
| 8.3 | 180 |
| 9.2 | 120 |
| 10.0 | 60 |
| 10.8 | 0 |
| 11.7 | 240 |
| 12.5 | 180 |
| 13.3 | 120 |
| 14.2 | 60 |
| 15.0 | 0 |
| 15.8 | 300 |
| 16.7 | 240 |
| 17.5 | 180 |
| 18.3 | 120 |
| 19.2 | 60 |
| 20.0 | 0 |

CL
AXC COAXIAL CABLE

LESS THAN 1cm
CL
AXC COAXIAL CABLE

MTC

MTC

MTC

FIG. 14

| r [cm] | d₂ [cm] |
|---|---|
| 0 | 0 |
| 1 | 1 |
| 2 | 2 |
| 3 | 3 |
| 4 | 4 |
| 5 | 0 |
| 6 | 1 |
| 7 | 2 |
| 8 | 3 |
| 9 | 4 |
| 10 | 0 |
| 11 | 1 |
| 12 | 2 |
| 13 | 3 |
| 14 | 4 |
| 15 | 0 |
| 16 | 1 |
| 17 | 2 |
| 18 | 3 |
| 19 | 4 |
| 20 | 0 |

| PHASE | RELUCTANCE (X) | VALUE OF L OR C |
|---|---|---|
| 60 | 1.732050843 | 0.275 × R  nH |
| 120 | 0.577350293 | 0.0918 × R  nH |
| 180 | 0 | 0 |
| 240 | -0.577350222 | 275/R  pF |
| 300 | -1.732050629 | 91.8/R  pF |

| r [cm] | FREQUENCY [GHz] | |
|---|---|---|
| 0 | 1.00 | |
| 10 | 1.29 | |
| 20 | 1.36 | |
| 30 | 1.00 | 1.40 |
| 40 | 1.11 | |
| 50 | 1.17 | |
| 60 | 1.00 | 1.22 |

TAG READING METHOD AND APPARATUS

BACKGROUND OF THE INVENTION

This invention relates to an RF tag reading method and apparatus for supplying a radio-information storage medium (an RF tag), which is equipped with an antenna and a semiconductor integrated circuit, with power by electromagnetic coupling and receiving a signal that is transmitted from the RF tag, thereby recognizing the tag and reading information that has been stored on the tag. More particularly, the invention relates to a tag reading method and apparatus for supplying power to a plurality of RF tags that overlap in the zone of supplied power and reading information from the tags.

A method employed widely in the prior art to manage individual items of product information in the distribution and transport industries involves printing or affixing a bar code on the product itself or on the box of the product and reading the bar code by a bar code reader. With a bar code processing method of this kind, however, the bar code reader must be brought into contact with the bar code when the bar code is read. This reading operation is a troublesome one. Another problem with the conventional bar code processing method is that new information cannot be added to a bar code per se and information contained by the bar code cannot be updated.

As a result, there is growing demand for systems in which an RF tag instead of a bar code is affixed to a product or the like and information relating to the product is read without contact by wireless means (electromagnetic coupling), and such systems are currently being put to practical use. An RF tag is a device in which a function for radio communication of information has been added to the functions of an IC card. The RF tag is equipped with a non-volatile memory that is capable of recording information but does not possess a battery (power source). As a consequence, when a tag reading apparatus contactlessly reads information from the memory of the RF tag, the RF tag is supplied with power by electromagnetic waves so that information can be read from the memory. In accordance with such an RF tag, operability can be improved by a wide margin. Moreover, by using an authentication function and techniques such as encryption in combination with an RF tag, outstanding security can be achieved.

FIG. 38 is a diagram useful in describing an RF tag. A reading apparatus 1 transmits a radio signal (electromagnetic waves), which has been modulated by transmit data, to an RF tag 3 from an antenna 2. The RF tag 3 has an antenna 3$a$ that inputs the receive signal to a rectifying circuit 3$b$ and modem circuit 3$c$. The rectifying circuit 3$b$ operates as a power source by converting the radio signal to a DC voltage and supplying the DC voltage to the modem circuit 3$c$ and to a logic circuit 3$d$. The modem circuit 3$c$ demodulates control data, which has been sent from the reading apparatus 1, and inputs the control data to the logic circuit 3$d$. The latter executes logical processing in accordance with the control data (commands), reads information that has been stored in an internal memory and inputs the information to the modem circuit 3$c$. The latter modulates a carrier wave using the information that has entered from the logic circuit 3$d$ and transmits the modulated signal from the antenna 3$a$ to the reading apparatus 1.

In a case where a plurality of RF tags are present within the zone of the supplied power, the reading apparatus 1 is capable of reading information from each RF tag in accordance with an anti-collision protocol. Various schemes have been proposed in regard to anti-collision protocols. For example, one is described in the specification of ISO 18000.

Even if a plurality of RF tags are located within the zone supplied with power, no problems arise so long as the RF tags do not overlap one another. Frequently, however, there are cases where articles overlap one another, as at the site of manufacture, in an automated warehouse or at the place of sales, and information is read from all tags at one time. If articles thus overlap one another, then a plurality of RF tags also will overlap. A situation arises in which RF tags near the reading apparatus receive power from the reading apparatus while RF tags that are more distant do not receive power satisfactorily.

Further, an RF tag is equipped with an antenna whose characteristic matches the radio frequency in order to receive power from the reading apparatus efficiently and communicate with the reading apparatus properly. However, when a plurality of RF tags are in close proximity to one another, the antenna characteristic shifts from the radio frequency owing to interaction among the tag antennas. As a result, the power supplied diminishes even further and does not attain a value at which more distant RF tags can operate. This means that information cannot be read from these tags.

A proposed method of solving this problem is to prepare a tag case and move the antenna within the tag case to thereby avoid overlap of the antennas. This makes it easy even for tags in back to receive power. (For example, see the specification of JP 2000-331136A).

FIGS. 39A, 39B are diagrams useful in describing an RF tag according to the prior art. The RF tag 5 includes an inlet 5$c$ (the portion encircled by the dashed line) seated within a tag case 6$a$. The inlet 5$c$ comprises a coil-shaped transceive antenna 5$a$ and an electronic part 5$b$ mounted on the surface of a board and connected to the transceive antenna 5$a$. The tag case 6$a$ has an internally provided inlet accommodating portion 6$b$ and is formed in such a manner that the internal diameter B thereof is sufficiently larger than diameter C of the inlet 5$c$ (i.e., B>C). By accommodating the inlet 5$c$ in the inlet accommodating portion 6$b$ without fixing it, the inlet 5$c$ received within the inlet accommodating portion 6$b$ is accommodated slidably without the position thereof being specified. By virtue of this arrangement, the transceive antennas can be staggered so as to overlap partially rather than completely even if a plurality of the RF tags 5 are read or written to in a stacked condition. As a result, power is fed to the transceive antennas of all RF tags, thereby making it possible to read information from and write information to each of the RF tags.

A problem which arises with the above technique, however, is that since the conventional RF tag has a tag case, the above-described technique cannot be applied to an article to which it is difficult to attach the tag case.

SUMMARY OF THE INVENTION

Accordingly, an object of the present invention is to so arrange it that even if RF tags are superimposed, power can be supplied to each of the tags to make possible the reading of information from the tags.

Another object of the present invention is to so arrange it that even if RF tags do not have tag cases, it is made possible to read information from superimposed RF tags.

Another object of the present invention is to so arrange it that limitations on products to which RF tags can be applied are eliminated.

The foregoing objects are attained by providing first to sixth aspects of a tag reading method, which are described below, for supplying power to at least one of a plurality of superimposed tags and reading information from the tag.

A first tag reading method of the present invention comprises supplying power, which is produced by high-frequency signals, to each tag by generating electromagnetic waves from a plurality of locations, e.g., from both sides of superimposed tags by the high-frequency signals and causing the electromagnetic waves to interfere on the tags, and controlling the phase difference between the high-frequency signals in accordance with the position of a tag from which information is read.

A second tag reading method of the present invention comprises supplying power, which is produced by a high-frequency signal, to each tag from one side of superimposed tags, placing a reflector, which reflects electromagnetic waves produced by the high-frequency signal, on the other side of the tags, causing the electromagnetic waves and the reflected electromagnetic waves to interfere on the superimposed tags, and controlling the position of the reflector in accordance with the position of a tag from which information is read.

A third tag reading method of the present invention comprises supplying power, which is produced by high-frequency signal, to each tag from one side of superimposed tags, placing a reflector, which reflects electromagnetic waves produced by the high-frequency signal, on the other side of the tags, causing the electromagnetic waves and the reflected electromagnetic waves to interfere on the superimposed tags, and controlling the reflectivity of the reflector in accordance with the position of a tag from which information is read.

A fourth tag reading method of the present invention comprises supplying power, which is produced by a high-frequency signal, to each tag by generating electromagnetic waves from a plurality of locations, e.g., from both sides of superimposed tags by the high-frequency signal and causing the electromagnetic waves to interfere on the tags, causing the high-frequency signal to branch, imparting a difference in propagation length between propagation lengths from the branch point to points at which respective ones of the electromagnetic waves are generated and, when the frequency of the high-frequency signal is changed from any low frequency to any high frequency, deciding the difference in propagation length in such a manner that the phase difference between the branched high-frequency signals is rotated through a required angle and controlling the frequency of the high-frequency signal in accordance with the position of a tag from which information is read.

A fifth tag reading method of the present invention comprises placing a transmission line along which there is leakage of electromagnetic waves at the periphery of superimposed tags, causing a high-frequency signal to branch, inputting the branched high-frequency signals to respective ones of both ends of the transmission line to thereby cause the signals to interfere with each other, controlling the phase difference between the branched high-frequency signals in accordance with the position of a tag from which information is read, and causing electromagnetic waves to leak from the transmission line to thereby supply power, which is produced by the high-frequency signal, to the tag.

A sixth tag reading method of the present invention comprises placing a transmission line along which there is leakage of electromagnetic waves at the periphery of superimposed tags, causing a high-frequency signal to branch, inputting the branched high-frequency signals to respective ones of both ends of the transmission line to thereby cause the signals to interfere, imparting a difference in length to propagation length between propagation lengths from the branch point to both ends of the transmission line and, when the frequency of the high-frequency signal is changed from any low frequency to any high frequency, deciding the difference in propagation length in such a manner that the phase difference between the branched high-frequency signals is rotated through a required angle, controlling the frequency of the high-frequency signal in accordance with the position of a tag from which information is read, and causing electromagnetic waves to leak from the transmission line to thereby supply power, which is produced by the high-frequency signal, to the tag.

The foregoing objects are attained by providing first to fourth aspects of a tag reading apparatus, which are described below, for supplying power to at least one of a plurality of superimposed tags and reading information from the tag.

A first tag reading apparatus according to the present invention comprises means for generating high-frequency signals; electromagnetic wave generating means to which the high-frequency signals are input for generating electromagnetic waves from a plurality of locations, e.g., from both sides of superimposed tags, by the high-frequency signals and causing the electromagnetic waves to interfere on the tags; means for deciding a phase difference between the high-frequency signals in accordance with the position of a tag from which information is read; and phase shifting means for controlling the phase of at least one high-frequency signal so to produce the phase difference.

A second tag reading apparatus according to the present invention comprises means for generating a high-frequency signal; electromagnetic wave generating means to which the high-frequency signal is input for generating electromagnetic waves from one side of superimposed tags by the high-frequency signal; a reflector provided on the other side of the tags for reflecting the electromagnetic waves produced by the high-frequency signal and causing the electromagnetic waves and the reflected electromagnetic waves to interfere on the superimposed tags; moving means for moving the reflector; and control means for controlling the position of the reflector in accordance with the position of a tag from which information is read.

A third tag reading apparatus according to the present invention comprises means for generating a high-frequency signal; branching means for branching the high-frequency signal; electromagnetic wave generating means for generating electromagnetic waves from a plurality of locations, e.g., from both sides of superimposed tags, by the high-frequency signals and causing the electromagnetic waves to interfere on the tags; a propagation path which, when the frequency of the high-frequency signal is changed from any low frequency to any high frequency, is for imparting a difference in propagation length between propagation lengths from the signal branch point to points at which the electromagnetic waves are generated, in such a manner that the phase difference between the branched high-frequency signals is rotated through a required angle; and control means for controlling the frequency of the high-frequency signal in accordance with the position of a tag from which information is read.

A fourth tag reading apparatus according to the present invention comprises a transmission line, which is provided at the periphery of superimposed tags, along which there is leakage of electromagnetic waves; means for generating a high-frequency signal; means for branching the high-frequency signal and inputting the branched high-frequency signals to respective ones of both ends of the transmission line; means for deciding a phase difference between the branched high-frequency signals based upon the position of a tag from which information is read; and means for controlling the phase of at least one high-frequency signal so as to produce the phase difference; wherein electromagnetic waves are caused to leak from the transmission line to thereby supply power, which is produced by the high-frequency signal, to the tag.

In accordance with the tag reading method and apparatus of the present invention, power can be supplied to each RF tag even if the RF tags are superimposed, thereby making it possible to read information from each tag. Further, in accordance with the tag reading method and apparatus of the present invention, information can be read from superimposed RF tags even if the RF tags are not accommodated in tag cases. This makes it possible to eliminate limitations on products to which RF tags can be applied.

Other features and advantage of the present invention will be apparent from the following description taken in conjunction with the accompanying drawings.

BRIEF DESCRIPTION OF THE DRAWINGS

FIG. 3 is a correspondence table illustrating correspondence between phase difference θ and distance r to a power peak point;

FIG. 14 is a correspondence table illustrating correspondence between the traveling distance d2 of the reflector and distance r to a power peak point;

DESCRIPTION OF THE PREFERRED EMBODIMENTS (A) Overview of the Present Invention

The present invention provides a tag reading apparatus for supplying power to at least one of a plurality of superimposed tags and reading information from the tag. The apparatus comprises means for generating high-frequency signals; electromagnetic wave generating means (antennas) to which the high-frequency signals are input for generating electromagnetic waves, which are produced by the high-frequency signals, from both sides of the superimposed tags, and causing the electromagnetic waves to interfere on the tags; means for deciding a phase difference between the high-frequency signals, which are supplied to the electromagnetic wave generating means provided on both sides of the tags, in accordance with the position of a tag from which information is read; and phase shifting means for controlling the phase of at least one high-frequency signal so to produce the phase difference.

According to this tag reading apparatus, power produced by high-frequency signals is supplied to each tag by generating electromagnetic waves, which are produced by the high-frequency signals, from both sides of superimposed tags and causing the electromagnetic waves to interfere on the tags, and the phase difference between the high-frequency signals is controlled in accordance with the position of a tag from which information is read.

(B) First Embodiment

Figure 1:
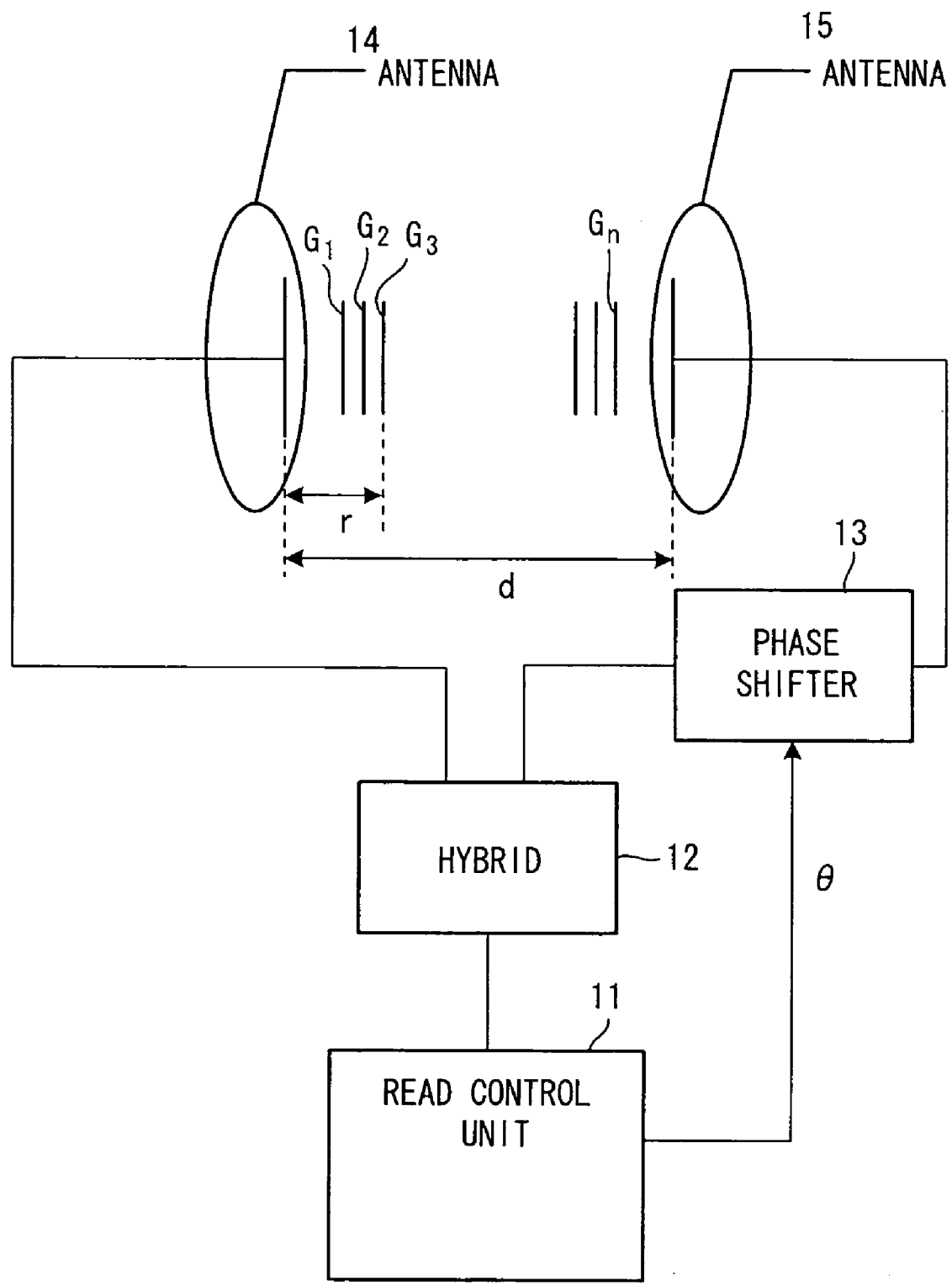
FIG. 1 is a diagram useful in describing a first embodiment of the present invention.

FIG. 1 is a diagram useful in describing a first embodiment of the present invention. When a read control unit 11 reads information from an RF tag affixed to or embedded in an article, the control unit modulates a carrier by read-control data and then frequency-converts the signal to a high-frequency signal and inputs the high-frequency signal to a hybrid 12. Further, on the basis of from which RF tag of articles G1 to Gn to which the RF tags are affixed information is to be read, i.e., on the basis of the position of a tag from which information is to be read (a read-target tag), the read control unit 11 decides the amount $\theta$ of phase shift of the high-frequency signal and inputs the amount of phase to a phase shifter 13. Here $\theta$ is a phase that makes it possible to supply a large power to the read-target tag. Antennas 14 and 15 are placed so as to sandwich, from both sides, a group of articles obtained by superimposing a plurality of articles Gi (i=1 to n) to which RF tags have been affixed.

The hybrid 12 branches the entered high-frequency signal into two high-frequency signals, inputs one of the high-frequency signals to the antenna 14, which is disposed on one of the side article group, and inputs the other high-frequency signal to the phase shifter 13. The latter shifts the phase of the high-frequency signal by the amount ($\theta$) of phase specified by the read control unit 11 and inputs the phase-shifted high-frequency signal to the antenna 15 disposed on the other side of the article group. As a result, electromagnetic waves advance from one antenna toward the other and interfere on a tag to produce standing waves there.

Let d represent the antenna spacing, r the distance from the antenna 14 to the read-target tag and $\theta$ the phase difference between the high-frequency signals input to the antennas 14 and 15. If it is assumed for the sake of simplicity that there is no loss in space, power at a position located at the distance r will be a factor of $$2\cos\left[2\pi\frac{(d-2r)}{2\lambda} - \frac{\theta}{2}\right] \quad (1)$$

of input power. In order to enlarge the standing waves at the position located at the distance r, it will suffice to decide $\theta$ so as to maximize Expression (1) when the distance is r. If the $\theta$ that maximizes Expression (1) is found, we will have $$\theta = \frac{2\pi}{\lambda}(d-2r) \pm 2n\pi \quad (2)$$

and therefore $\theta$ should be controlled in accordance with Equation (2).

Figure 2:
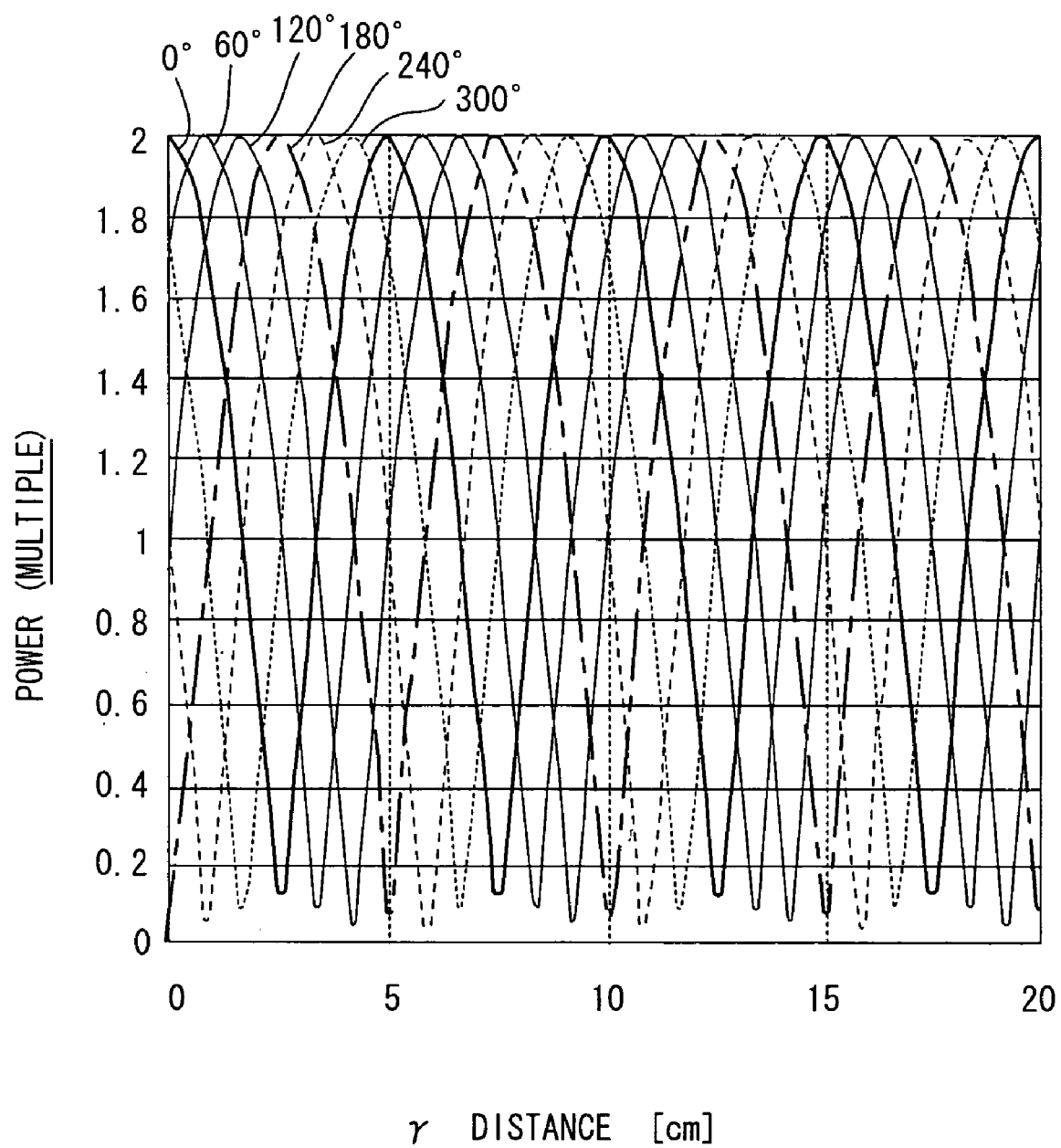
FIG. 2 is a P-r curve illustrating power P at a position at distance r while a phase difference θ is varied.

FIG. 2 is a characteristic curve (P-r curve) illustrating power P at a position at the distance r in a case where the phase difference $\theta$ is varied from 0 to 3600 in steps of 600 when the wavelength of the high-frequency signal is 10 cm and the antenna spacing is 20 cm. It will be understood that as the phase difference $\theta$ is increased, a peak point at which power is maximized is shifted rightward. That is, it will be appreciated that power is being supplied only to a tag that is limited with respect to the predetermined phase difference $\theta$. Accordingly, the correspondence between phase difference $\theta$ and distance r (cm) to the power peak point is calculated and tabulated in the manner shown in FIG. 3 and the table is provided in the read control unit 11 beforehand. The read control unit 11 finds the phase difference $\theta$ that corresponds to the distance r to the read-target tag from the table and sets this phase difference in the phase shifter 13. As a result, power can be supplied to the read-target tag efficiently and control data can be sent to the read-target tag reliably. Further, a high-frequency signal that has been modulated by information read from the memory of the read-target tag is input to the read control unit 11 via the antennas 14, 15 and hybrid 12. It should be noted that although the table of FIG. 3 has been created in such a manner that $\theta$ increases is varied at intervals of 600, the table can also be created by varying phase more finely. Further, $\theta$ can be tabulated in correspondence with the particular number of the read-target tag.

Figure 4:
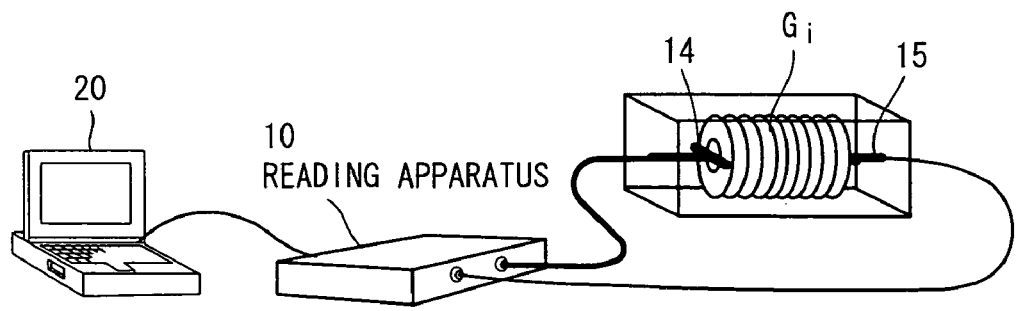
FIG. 4 is a diagram of an overall system having a tag reading apparatus according to the first embodiment.
Figure 5:
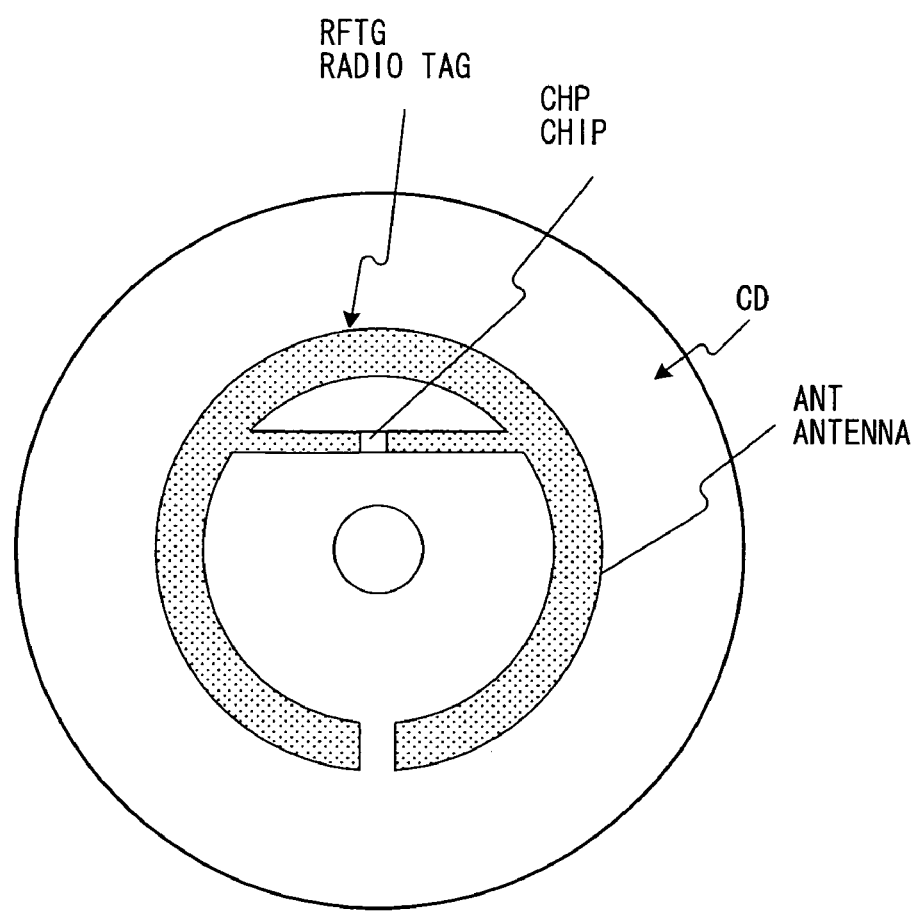
FIG. 5 is a diagram useful in describing a state in which an RF tag has been affixed about the periphery of a hole in a compact disc.
Figure 38:
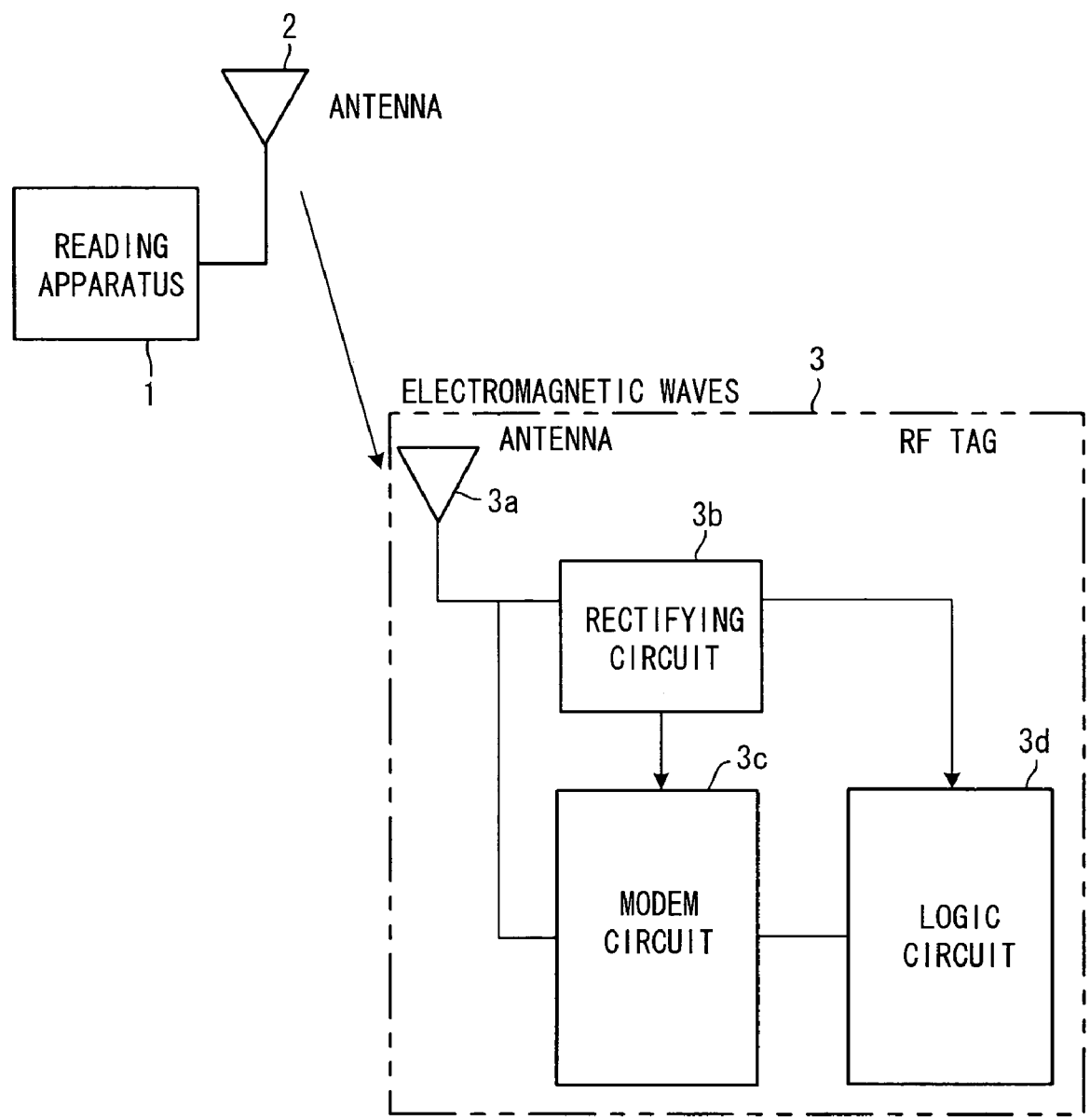
FIG. 38 is a diagram useful in describing an RF tag according to the prior art.
Figure 39A:
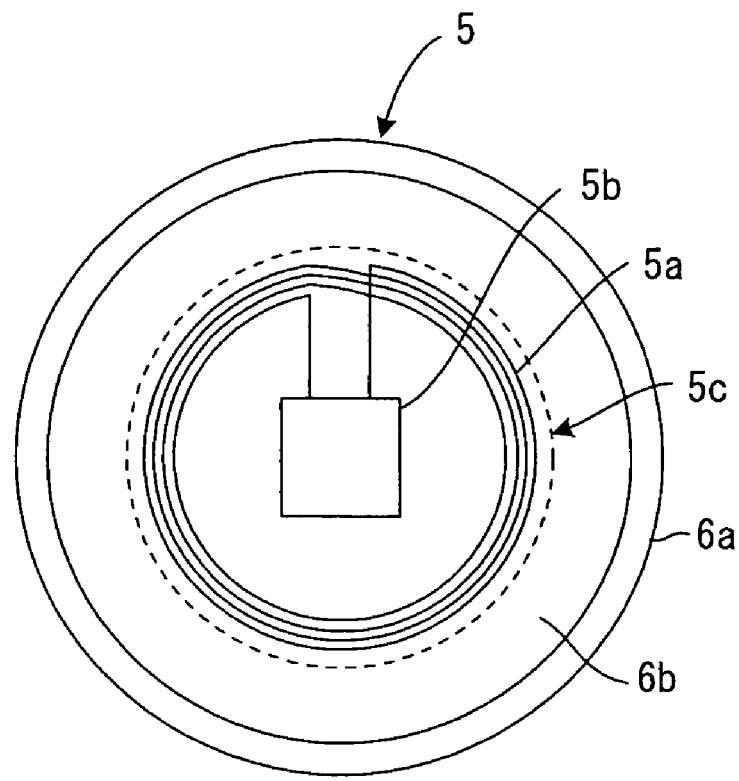
FIGS. 39A, 39B are diagrams useful in describing an RF tag according to the prior art.
Figure 39B:
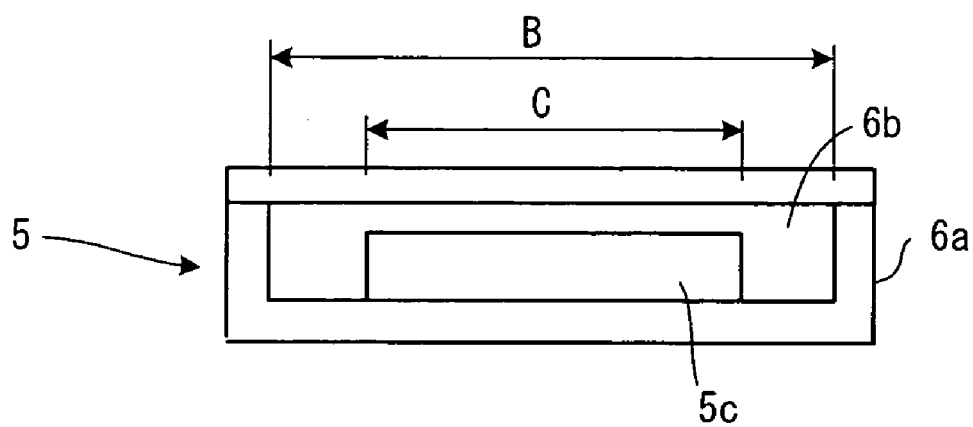

FIG. 4 is a diagram of an overall system having a tag reading apparatus according to the first embodiment. In accordance with a command from a personal computer 20, a reading apparatus 10 reads information from an RF tag affixed to an article Gi (e.g., a compact disc) and inputs the read information to the personal computer 20. An RF tag RFTG has the structure described electrically with reference to FIG. 38. The RF tag RFTG has an antenna ANT and a chip CHP which, in the example illustrated in FIG. 5, are affixed to a compact disc CD at the periphery of the center hole.

Figure 6:
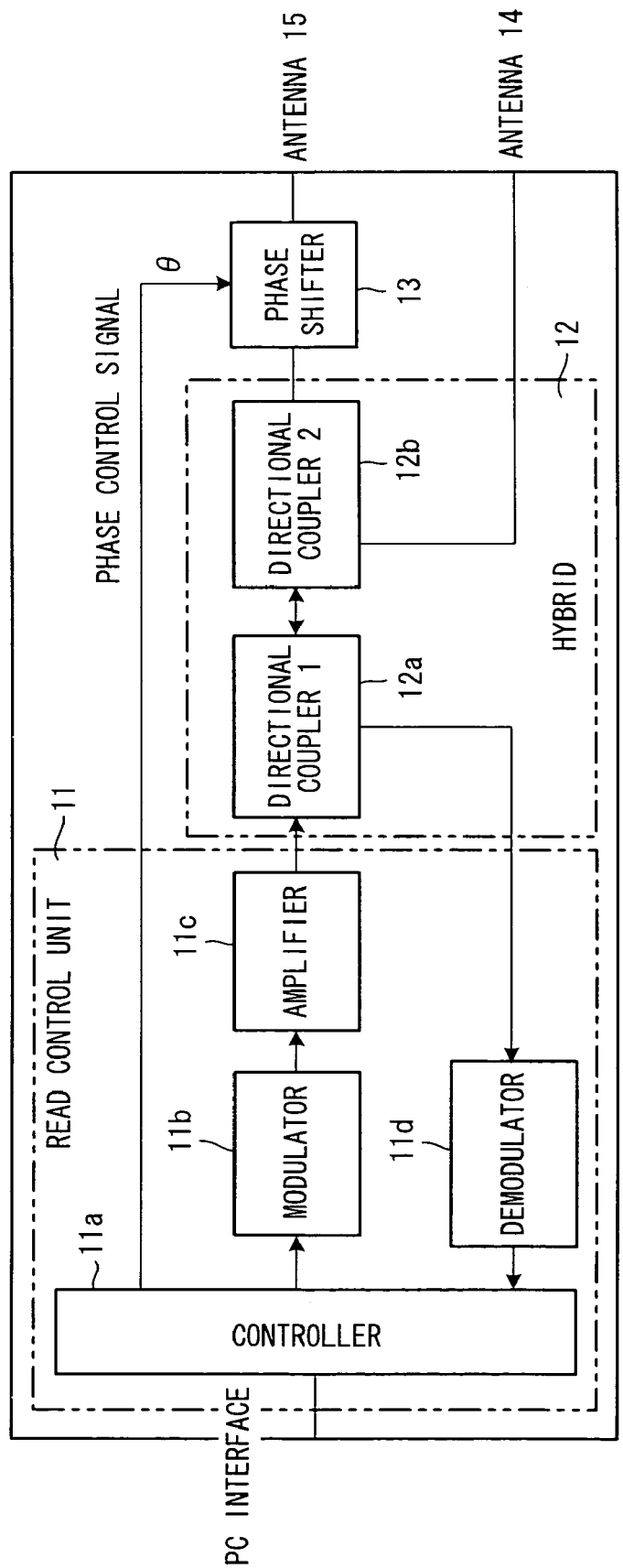
FIG. 6 is a block diagram of the tag reading apparatus shown in FIG. 4.

FIG. 6 is a block diagram of the tag reading apparatus 10 shown in FIG. 4. The apparatus includes the read control unit 11, hybrid 12 and phase shifter 13. The read control unit 11 has a controller 11a which, in response to a control signal from the personal computer 20, performs control that is in accordance with radio specifications (a protocol). For example, the controller 11a carries out anti-collision control, tag-ID reading control, data transceive control for implementing the protocol, and phase control, etc. A modulator 11b modulates a carrier by transmit data and frequency-converts the modulated carrier signal to a high-frequency signal. An amplifier 11c amplifies the high-frequency signal and inputs the amplified signal to a first directional coupler 12a in the hybrid 12. The first directional coupler 12a outputs the high-frequency signal to the antenna side (to a second directional coupler 12b). The second directional coupler 12b branches the entered high-frequency signal into two high-frequency signals and inputs one high-frequency signal to the phase shifter 13 and the other high-frequency signal to the antenna 14. The phase shifter 13 shifts the phase of the high-frequency signal by the amount ($\theta$) of phase specified by the controller 11a and inputs the phase-shifted high-frequency signal to the antenna 15. On the other hand, a high-frequency signal transmitted from an RF tag is received by the antennas 14, 15 and input to a demodulator 11d via the directional couplers 12b and 12a in the order mentioned. The demodulator 11d demodulates the information read from the RF tag and inputs the information to the controller 11a.

Furthermore, the first directional coupler 12a suppresses the power that the transmit signal outputs to the demodulator 11d, and the second directional coupler 12b suppresses the power output from the antenna 14 to the antenna 15 and the power output from the antenna 15 to the antenna 14.

Figure 7:
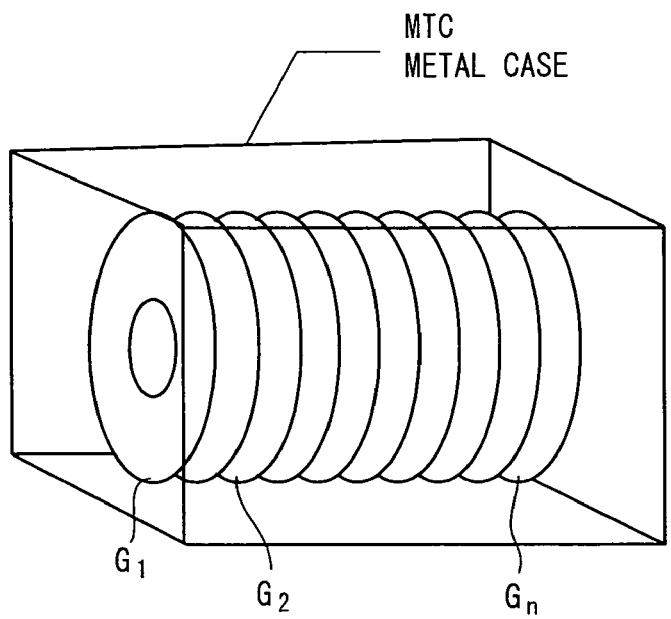
FIG. 7 illustrates a first example of a case where the periphery of a group of articles is enclosed by a metal case.

FIG. 7 illustrates a first example in which an article group is enclosed by a metal case MTC. In free space, electromagnetic waves are attenuated as distance from the high-frequency output source (antennas 14, 15) increases. This attenuation can be suppressed by enclosing the group of articles in the metal case in the manner shown in FIG. 7. This arrangement utilizes waveguide theory.

Figure 8:
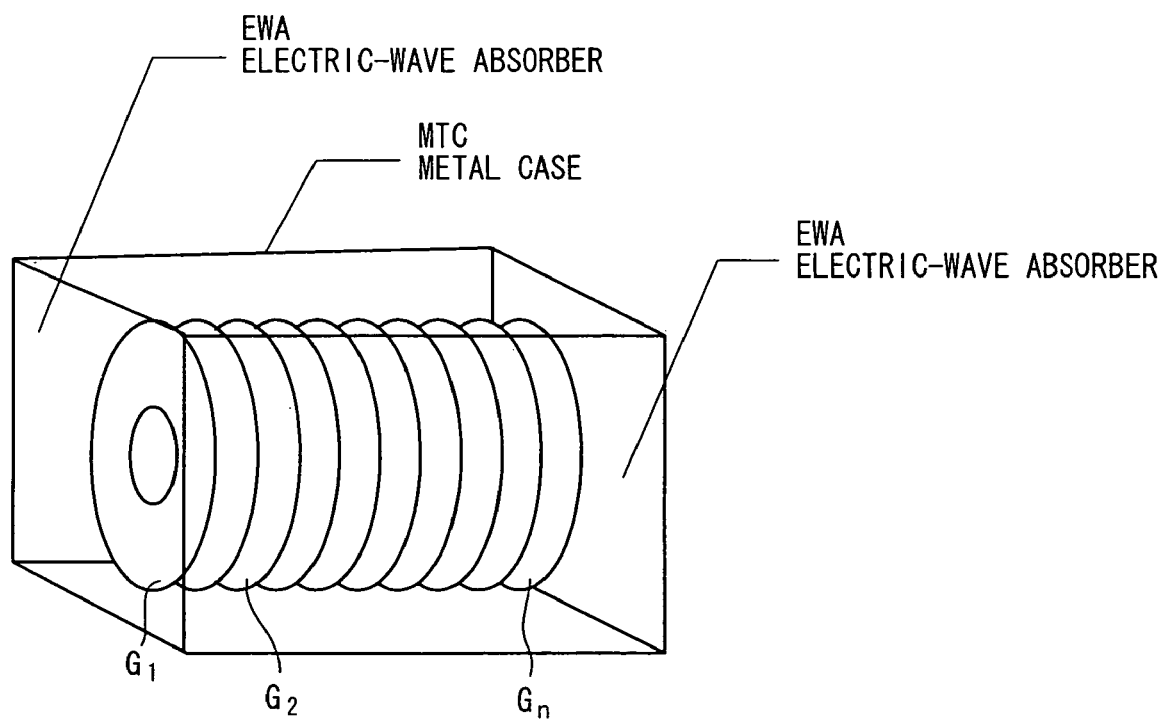
FIG. 8 illustrates a second example of a case where the periphery of a group of articles is enclosed by a metal case.

FIG. 8 illustrates a second example in which the article group is enclosed by the metal case MTC. Here electric-wave absorbers EWA are provided on the side faces of the metal case MTC to suppress unwanted reflection from the sides.

Figure 9A:
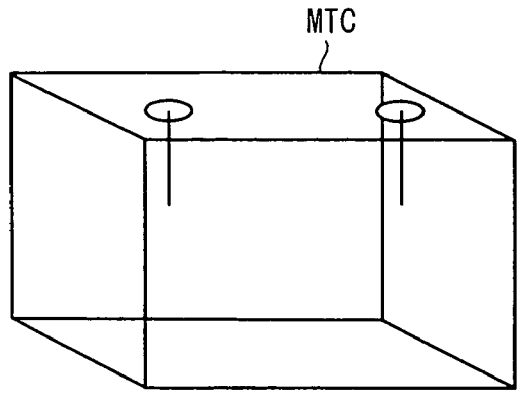
FIGS. 9A, 9B and 9C are diagrams useful in describing methods of supplying power to the interior of the metal case.
Figure 9B:
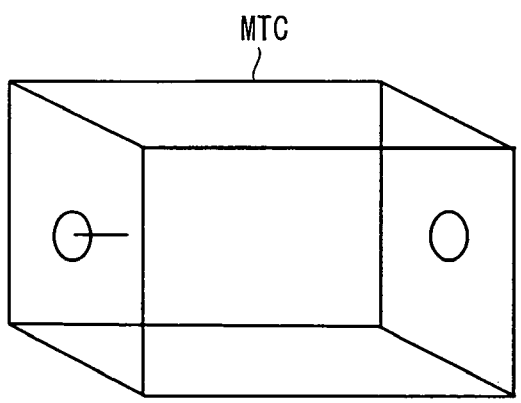
Figure 9C:
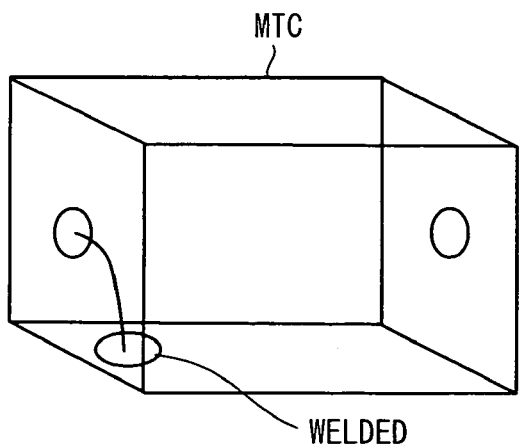

FIGS. 9A, 9B and 9C are diagrams useful in describing methods of supplying power to the interior of the metal case MTC. Various methods are available. One method is to feed in power by linear antennas from the top (or bottom) of the metal case, as shown in FIG. 9A. A second method is to feed in power by linear and loop antennas from the sides faces of the metal case, as shown in FIG. 9B. A third method is to connect the distal end of a linear antenna to an external case, as shown in FIG. 9C.

Figure 10A:
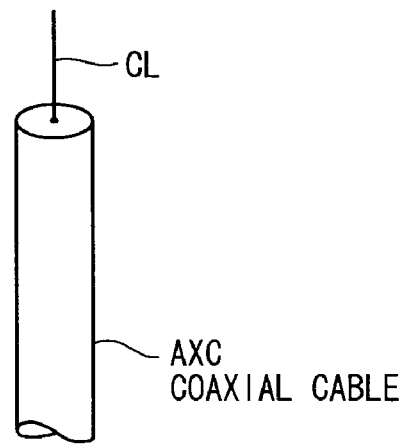
FIGS. 10A and 10B are diagrams useful in describing a linear antenna and a loop antenna, respectively.
Figure 10B:
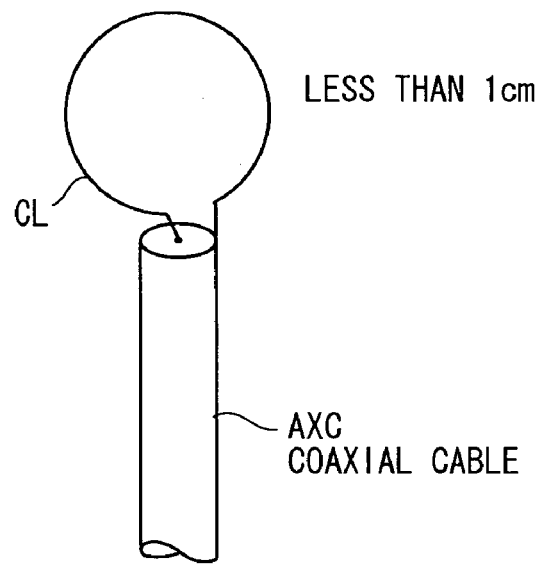

FIGS. 10A and 10B are diagrams useful in describing a linear antenna and a loop antenna, respectively. The linear antenna is formed by baring a center conductor CL of a coaxial cable AXC into linear form, as shown in FIG. 10A. The loop antenna is formed by baring a center conductor CL of a coaxial cable AXC into linear form and connecting the distal end to the external conductor.

Figure 11A:
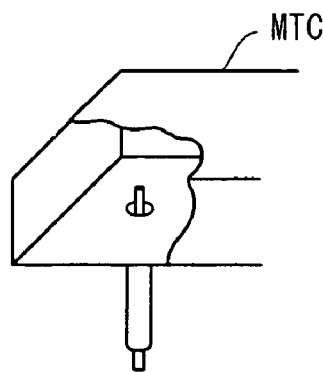
FIGS. 11A, 11B and 11C illustrate examples in which a linear antenna and a loop antenna are attached to a metal case.
Figure 11B:
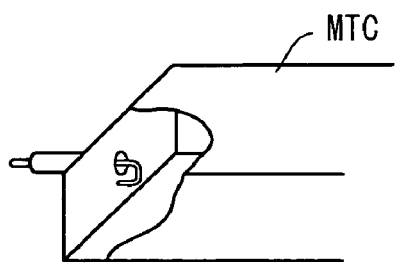
Figure 11C:
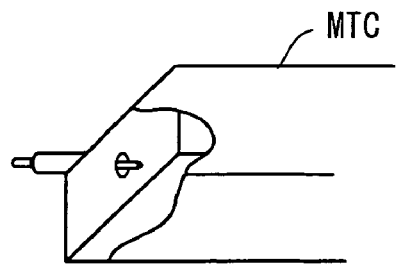

FIGS. 11A, 11B and 11C illustrate examples in which the linear antenna and loop antenna shown in FIGS. 10A and 10B, respectively, are attached to a metal case. FIG. 11A is an explanatory view of an example where the antenna is attached from the bottom of the case, and FIGS. 11A, 11B are explanatory views of examples where the antenna is attached from the side face of the case.

Thus, in accordance with the first embodiment, electromagnetic waves are generated from both sides of superimposed tags by high-frequency signals, power is supplied to each tag by causing the electromagnetic waves to interfere on the tags, and the phase difference between the high-frequency signals is controlled in accordance with the position of a tag from which information is read. As a result, power can be supplied efficiently to an RF tag from which information is to be read and information can be sent and received reliably between RF tags and the tag reading apparatus.

(C) Second Embodiment

Figure 12:
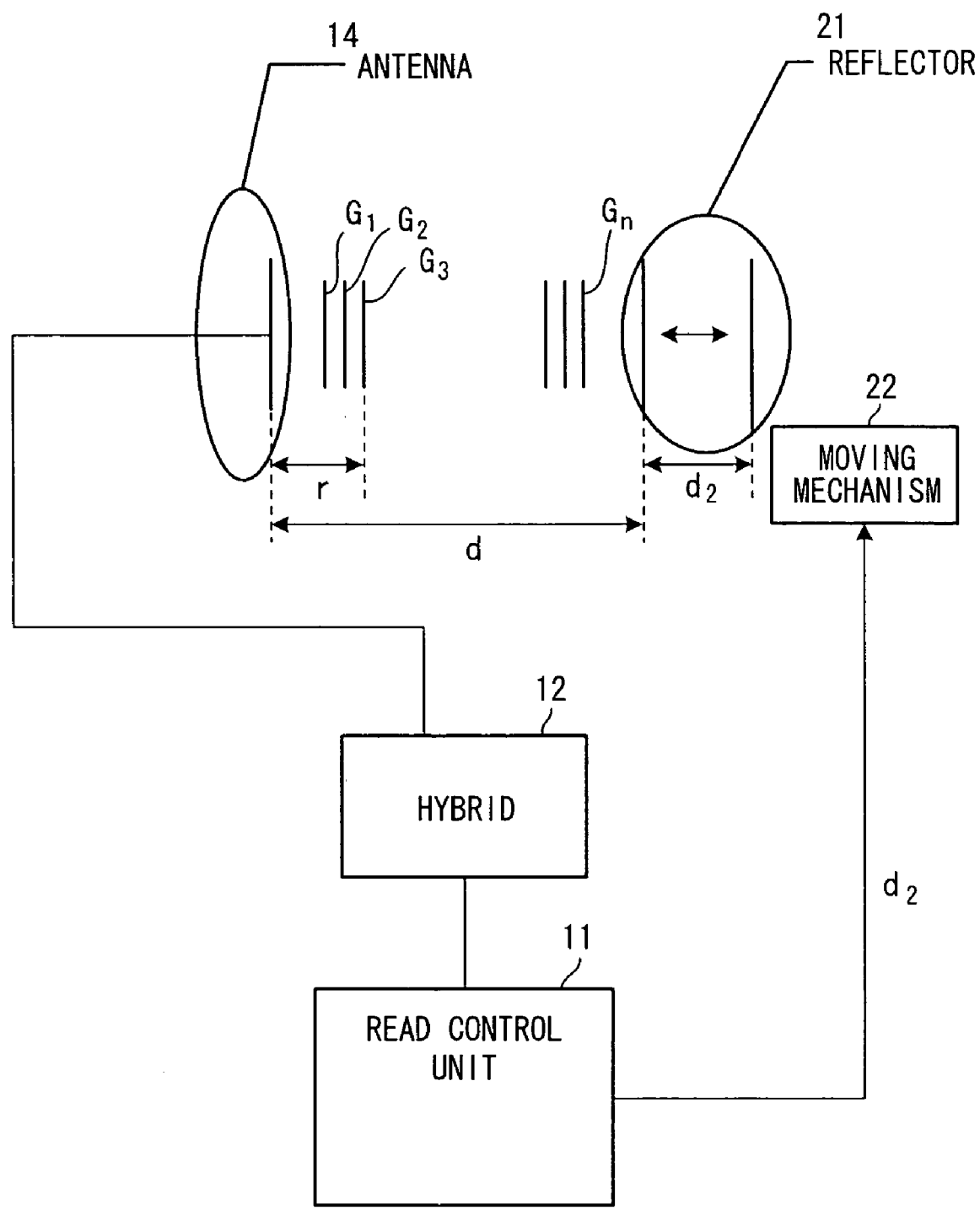
FIG. 12 is a diagram useful in describing a second embodiment of the present invention.

FIG. 12 is a diagram useful in describing a second embodiment of the present invention, in which components identical with those of the first embodiment of FIG. 1 are designated by like reference characters. This embodiment differs from the first embodiment in that the phase shifter 13 and antenna 15 are deleted and the apparatus is instead provided with a reflector 21 for reflecting electromagnetic waves emitted from the antenna 14, and with a moving mechanism 22 for moving the reflector 21. The reflector 21 travels a distance d2 under the control of the moving mechanism 22.

When the read control unit 11 reads information from an RF tag affixed to or embedded in an article, the control unit modulates a carrier by read-control data and then frequency-converts the signal to a high-frequency signal and inputs the high-frequency signal to the hybrid 12. Further, on the basis of from which RF tag of articles G1 to Gn to which the RF tags are affixed information is to be read, i.e., on the basis of the position of a tag from which information is to be read, the read control unit 11 decides the amount d2 of movement of the reflector 21 and inputs d2 to the moving mechanism 22. Here the amount d2 of movement is a distance that makes it possible to supply a large power to the read-target tag. The antenna 14 and reflector 21 are placed so as to sandwich, from both sides, the group of articles obtained by superimposing the plurality of articles Gi (i=1 to n) to which RF tags have been affixed.

The hybrid 12 inputs the entered high-frequency signal to the antenna 14 disposed on one side of the group of articles. The moving mechanism 22 moves the reflector 21 the distance d2 specified by the read control unit 11. As a result, electromagnetic waves produced by the antenna 14 advance toward the reflector 21 and are reflected thereby. The radio waves produced by the antenna 14 and the radio waves reflected by the reflector 21 thenceforth interfere on a tag and produce standing waves.

The distance between the antenna 14 and the reflector 21 is d+d2.

Let r represent the distance from the antenna 14 to an RF tag from which information is to be read out. If it is assumed for the sake of simplicity that there is no loss in space, power at a position located at the distance r will be a factor of $$2\cos\left[2\pi\frac{(d+d_2-r)}{\lambda}\right] \qquad (3)$$

of input power. In order to enlarge the standing waves at the position located at the distance r, it will suffice to decide d2 so as to maximize Expression (3) when the distance is r. If the d2 that maximizes Expression (3) is found, we will have $$d_2 = r - d \pm n\frac{\lambda}{2} \qquad (4)$$

and therefore d2 should be controlled in accordance with Equation (4).

Figure 13:
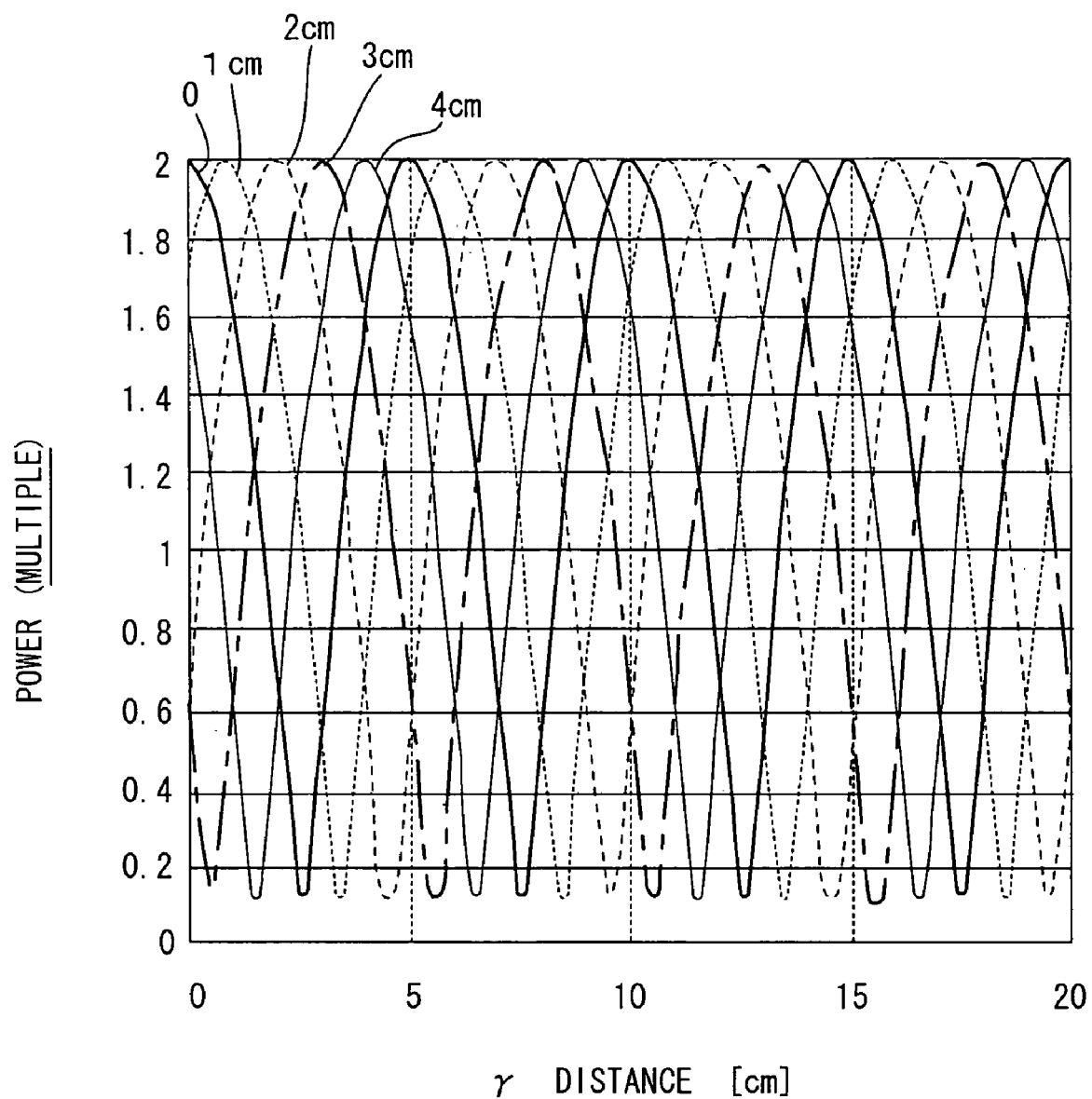
FIG. 13 is a P-r curve illustrating power P at a position at distance r while a traveling distance d2 of a reflector is varied.

FIG. 13 is a characteristic curve (P-r curve) illustrating power P at a position at the distance r in a case where d2 is varied from 0 to 4 cm in steps of 1 cm when the wavelength of the high-frequency signal is 10 cm and the antenna spacing is 20 cm. It will be understood that as the traveling distance d2 is increased, a peak point at which power is maximized is shifted rightward. That is, it will be appreciated that power is being supplied only to a tag that is limited with respect to the predetermined traveling distance d2. Accordingly, the correspondence between traveling distance d2 and distance r (cm) to the power peak point is calculated and tabulated in the manner shown in FIG. 14 and the table is provided in the read control unit 11 beforehand. The read control unit 11 finds the traveling distance d2 that corresponds to the distance r to the read-target tag from the table and sets this phase difference in the moving mechanism 22. As a result, power can be supplied to the read-target tag efficiently and control data can be sent to the read-target tag reliably. Further, a high-frequency signal that has been modulated by information read from the memory of the read-target tag is input to the read control unit 11 via the antennas 14 and hybrid 12. It should be noted that although the table of FIG. 14 has been created in such a manner that d2 is varied at intervals of 1 cm, the table can also be created by varying traveling distance more finely. Further, the traveling distance d2 can be tabulated in correspondence with the particular number of the read-target tag.

Figure 15:
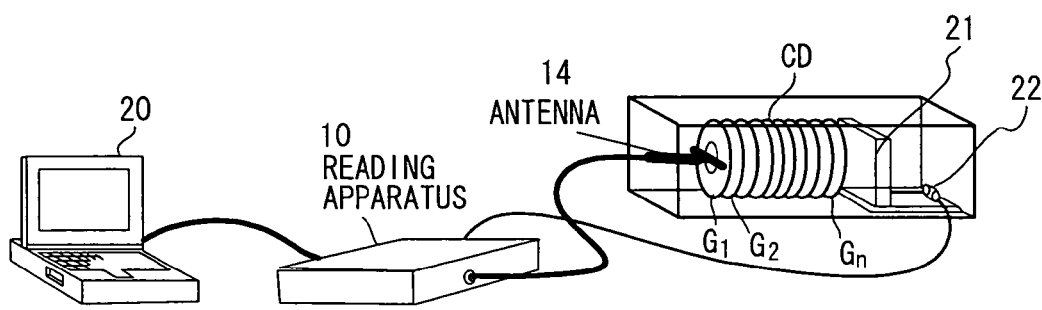
FIG. 15 is a diagram of an overall system having a tag reading apparatus according to the second embodiment.

FIG. 15 is a diagram of an overall system having a tag reading apparatus according to the second embodiment. In accordance with a command from the personal computer 20, the reading apparatus 10 reads information from an RF tag affixed to an article Gi (e.g., a compact disc) and inputs the read information to the personal computer 20. It should be noted that components identical with those shown in FIG. 12 are designated by like reference characters. Though the details are not illustrated, the moving mechanism 22 may be a well-known single-axis positioning mechanism, e.g., a reflector carrying table, a drive axis for guiding the table along the direction of the antenna 14, and a motor for rotating the drive axis.

Figure 16:
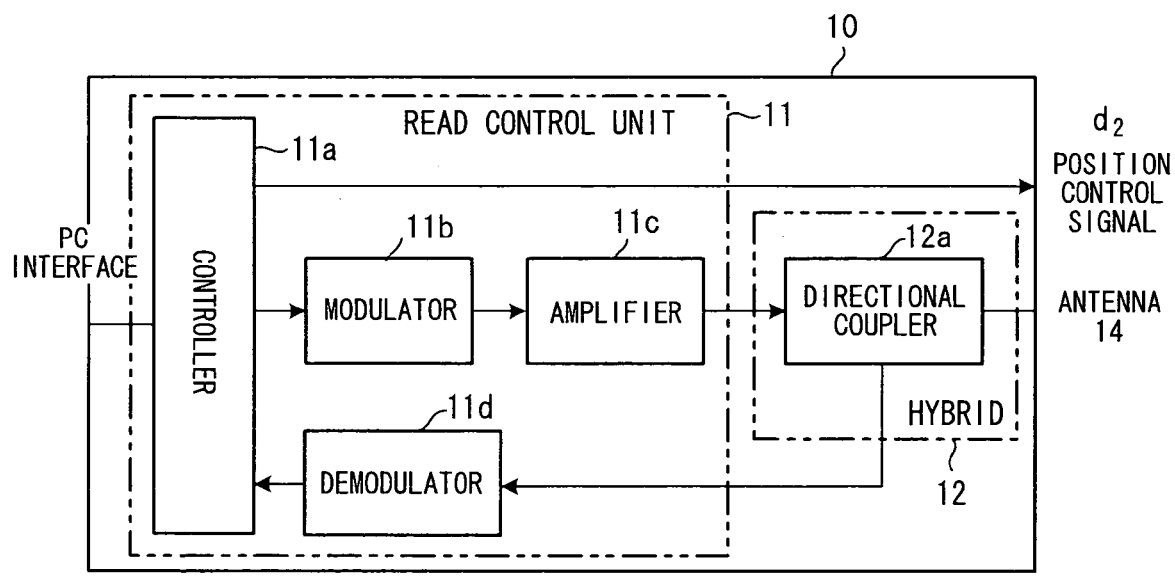
FIG. 16 is a block diagram of the tag reading apparatus shown in FIG. 15.

FIG. 16 is a block diagram of the tag reading apparatus 10 shown in FIG. 15. The apparatus includes the read control unit 11 and the hybrid 12. In response to a control signal from the personal computer 20, the controller 11a carries out anti-collision control, tag-ID reading control, data transceive control for implementing the protocol, and control of the amount of movement of the moving mechanism. The modulator 11b modulates a carrier by transmit data and frequency-converts the modulated carrier signal to a high-frequency signal. The amplifier 11c amplifies the high-frequency signal and inputs the amplified signal to the directional coupler 12a in the hybrid 12. The directional coupler 12a inputs the entered high-frequency signal to the antenna 14. The moving mechanism 22 moves the reflector 21 by the traveling distance d2 based upon a command from the controller 11a.

On the other hand, a high-frequency signal transmitted from an RF tag is received by the antenna 14 and is input to the demodulator 11d via the directional coupler 12a. The demodulator 11d demodulates the information read from the RF tag and inputs the information to the controller 11a.

The article group is not enclosed by a metal case in the description rendered above. However, it can be so arranged that the article group is enclosed within the metal case MTC in the manner illustrated in FIGS. 7 and 8.

Thus, in accordance with the second embodiment, power, which is produced by a high-frequency signal, is supplied to each tag from one side of the superimposed tags, a reflector that reflects electromagnetic waves produced by the high-frequency signal is placed on the other side of the tags, the electromagnetic waves and the reflected electromagnetic waves are caused to interfere on the superimposed tags, and the position of the reflector is controlled in accordance with the position of a tag from which information is read. As a result, power can be supplied efficiently to an RF tag from which information is to be read and information can be sent and received reliably between RF tags and the tag reading apparatus.

(D) Third Embodiment

Figure 17:
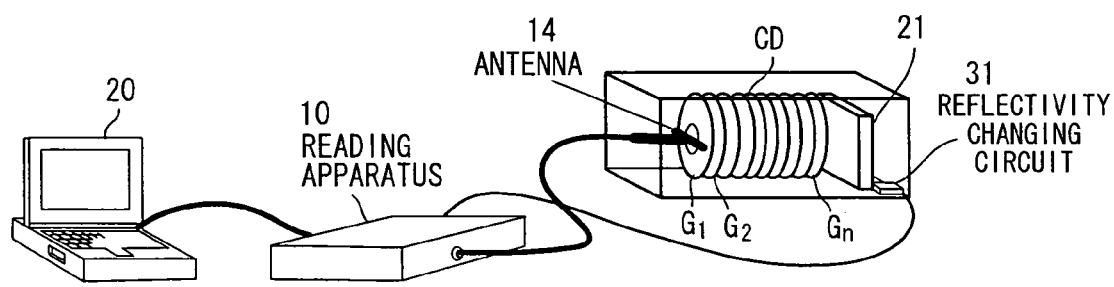
FIG. 17 is a diagram of an overall system having a tag reading apparatus according to a third embodiment of the present invention.
Figure 18:
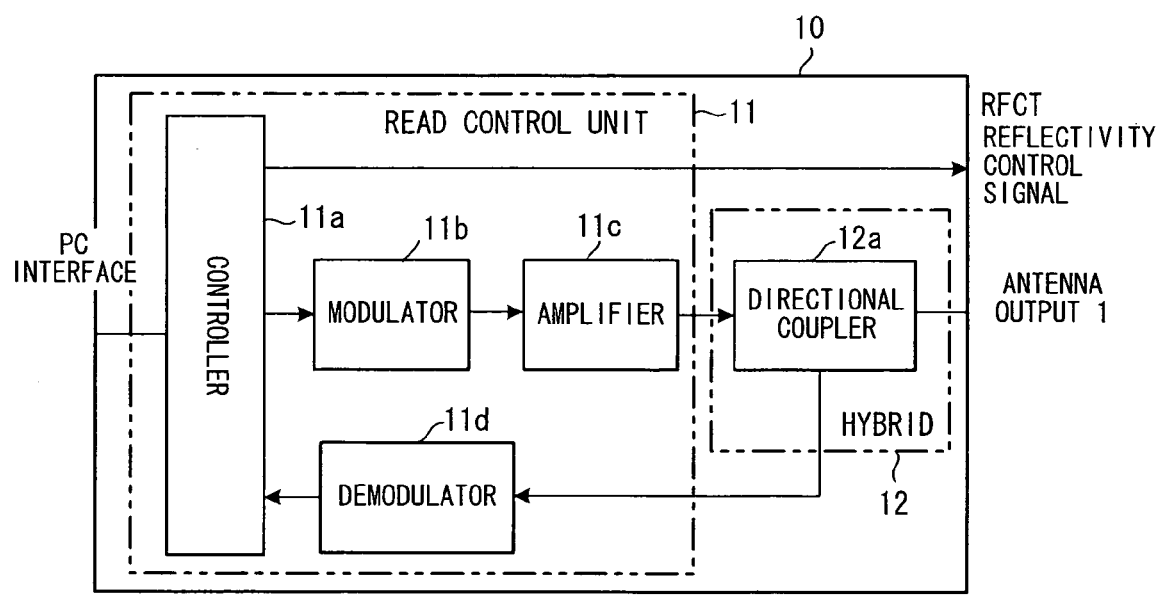
FIG. 18 is a block diagram of the tag reading apparatus shown in FIG. 17.

FIG. 17 is a diagram of an overall system having the tag reading apparatus 10 according to a third embodiment, and FIG. 18 is a block diagram of the tag reading apparatus 10 shown in FIG. 17. Components identical with those of the second embodiment of FIGS. 15 and 16 are designated by like reference characters. This embodiment differs in that the moving mechanism 22 for moving the reflector 21 is deleted and the apparatus is instead provided with a reflectivity changing circuit 31 for changing the reflectivity of the reflector 21, in that and the controller 11a decides the reflectivity based upon the position of an RF tag from which information is to be read and inputs a reflectivity control signal RFCT to the reflectivity changing circuit 31.

In response to a control signal from the personal computer 20, the controller 11a carries out anti-collision control, tag-ID reading control, data transceive control for implementing the protocol, and reflectivity control of the reflectivity changing circuit 31. The modulator 11b modulates a carrier by transmit data and frequency-converts the modulated carrier signal to a high-frequency signal. The amplifier 11c amplifies the high-frequency signal and inputs the amplified signal to the directional coupler 12a in the hybrid 12. The directional coupler 12a inputs the entered high-frequency signal to the antenna 14. The reflectivity changing circuit 31 controls the reflectivity of the reflector 21 based upon a command from the controller 11a.

On the other hand, a high-frequency signal transmitted from an RF tag is received by the antenna 14 and is input to the demodulator 11d via the directional coupler 12a. The demodulator 11d demodulates the information read from the RF tag and inputs the information to the controller 11a.

Figures 19, 20:
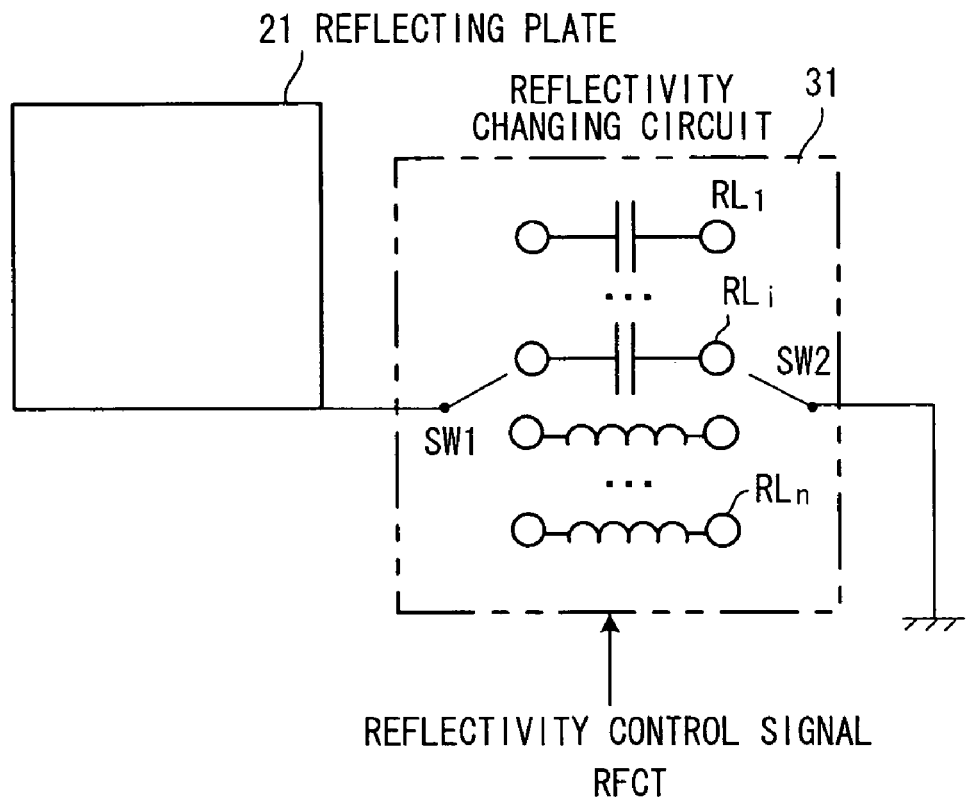
FIG. 19 illustrates an example of arrangement of a reflector (reflector plate) and a reflectivity changing circuit.
FIG. 20 is a correspondence table illustrating the correspondence between θ and L, C when frequency is 1 GHz.

FIG. 19 illustrates an example of arrangement of the reflector (reflecting plate) 21 and the reflectivity changing circuit 31. The reflector 21 has the structure of a plate antenna. The reflectivity changing circuit 31, which has switches SW1, SW2 and a number of reluctance elements RL1 to RLn, operates on the basis of the reflectivity control signal RFCT from the controller 11a so as to connect a prescribed reluctance element RLi to the reflector (reflecting plate) 11 by switches SW1, SW2.

Power at a distance r from the antenna 14 is expressed by Expression (1). In order to enlarge the standing waves at the position located at the distance r, it will suffice to decide θ so as to maximize Expression (1) and reflectivity should be controlled in accordance with Equation (2).

If the reflectivity changing circuit 31 of FIG. 19 has been connected to the reflector 21, the real part of the impedance ideally is zero and the size of the reflection coefficient is 1 (full reflection). The phase θ is given by the following equation:

$$\frac{2X}{X^2-1} = \tan\theta \quad (5)$$

where X represents the normalized reluctance.

Accordingly, it will suffice to decide the reluctance X (L or C) that satisfies Equation (5) from the relationship between r and θ in FIG. 3 and provide the controller 11a with an L-r correspondence table instead of the θ-r correspondence table. FIG. 20 shows the values of θ and L, C when frequency is 1 GHz. Here R represents the characteristic impedance.

It should be noted that the table can also be created by varying the value of X more finely. Further, the reluctance value (reluctance element) can be tabulated in accordance with the particular tag number of the tag.

The article group is not enclosed by a metal case in the description rendered above. However, it can be so arranged that the article group is enclosed within the metal case MTC in the manner illustrated in FIGS. 7 and 8.

Thus, in accordance with the third embodiment, power, which is produced by a high-frequency signal, is supplied to each tag from one side of the superimposed tags, a reflector that reflects electromagnetic waves produced by the high-frequency signal is placed on the other side of the tags, the electromagnetic waves and the reflected electromagnetic waves are caused to interfere on the superimposed tags, and the reflectivity of the reflector is controlled in accordance with the position of a tag from which information is read. As a result, power can be supplied efficiently to an RF tag from which information is to be read and information can be sent and received reliably between RF tags and the tag reading apparatus.

(E) Fourth Embodiment

Figure 21:
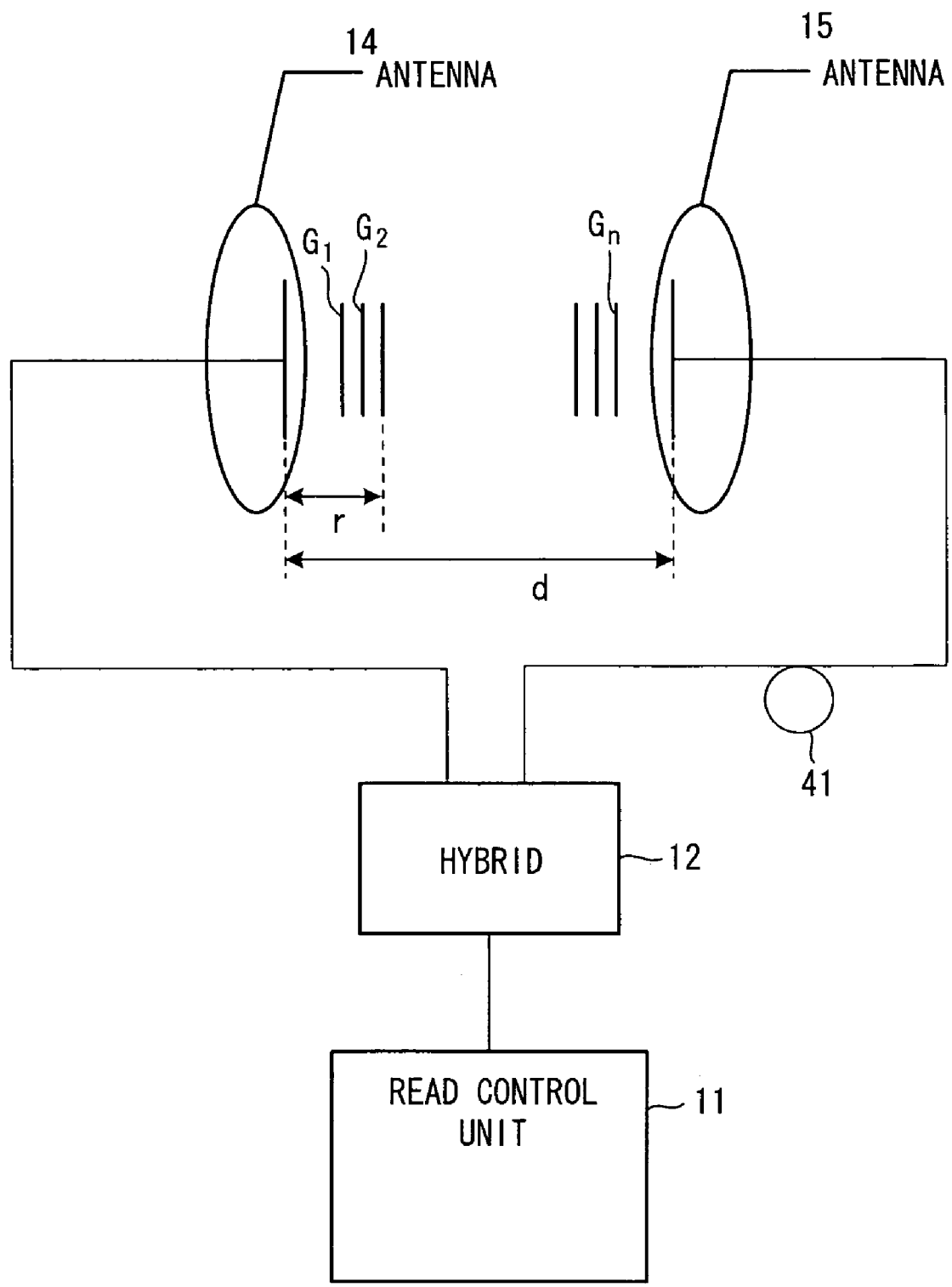
FIG. 21 is a diagram useful in describing a fourth embodiment of the present invention.

FIG. 21 is a diagram useful in describing a fourth embodiment of the present invention, in which components identical with those of the first embodiment of FIG. 1 are designated by like reference characters. This embodiment differs from the first embodiment in that the phase shifter 13 is deleted and the apparatus is instead provided with a coaxial cable 41 of length d3, which adjusts line length, inserted between the hybrid 12 and antenna 15. In the first embodiment, the phase shifter 13 furnishes a phase difference between the high-frequency signals input to the antennas 14 and 15. In the fourth embodiment, the lengths of the transmission lines from the hybrid (branch point) 12 to the antennas 14, 15 are provided with a difference in length, a phase difference is produced by this difference in length and the phase difference is adjusted and controlled by changing the frequency of the high-frequency signal.

When the read control unit 11 reads information from an RF tag affixed to or embedded in an article, the control unit modulates a carrier by read-control data and then frequency-converts the signal to a high-frequency signal and inputs the high-frequency signal to the hybrid 12. Further, on the basis of from which RF tag of articles G1 to Gn to which the RF tags are affixed information is to be read, i.e., on the basis of the position of a tag from which information is to be read, the read control unit 11 changes over the frequency of the high-frequency signal. This frequency has a value that makes it possible to supply a large power to the read-target tag, as will be described later. The antennas 14 and 15 are placed so as to sandwich, from both sides, a group of articles obtained by superimposing a plurality of articles Gi (i=1 to n) to which RF tags have been affixed.

The hybrid 12 branches the entered high-frequency signal into two high-frequency signals, inputs one of the high-frequency signals to the antenna 14, which is disposed on one side of the article group, and inputs the other high-frequency signal to the antenna 15 via the coaxial cable 41, thereby providing a phase difference θ between the high-frequency signals input to the antennas 14 and 15. As a result, electromagnetic waves advance from one antenna toward the other and interfere on a tag to produce standing waves there.

Let d represent the antenna spacing, r the distance from the antenna 14 to the read-target tag and θ the phase difference between the high-frequency signals input to the antennas 14 and 15. Power at a position located at the distance r is expressed by Expression (1). In order to enlarge the standing waves at the position located at the distance r, it will suffice to exercise control in such a manner that the phase difference θ satisfies Equation (2).

The length d3 of the coaxial cable 41 is assumed to be as follows:

$$d_3 = \frac{\lambda \min}{\lambda \max - \lambda \min} \lambda \max \qquad (6)$$

where is assumed that the frequency range of the high-frequency signal that can be set by the read control unit 11 is fmin to fmax (wavelength range λmax to λmin). Since it will suffice to decide the wavelength λ (frequency) that conforms to the θ that satisfies Equation (2), we find λ from Equations (2) and (6) as follows:

$$\lambda = \frac{(d - 2r)(\lambda \max - \lambda \min) - \lambda \max \cdot \lambda \min}{\pm n(\lambda \max - \lambda \min) - \lambda \min} \qquad (7)$$

where n is positive integer. Accordingly, it will suffice to control the wavelength λ (or frequency) of the high-frequency signal in accordance with Equation (7).

Figures 22, 23:
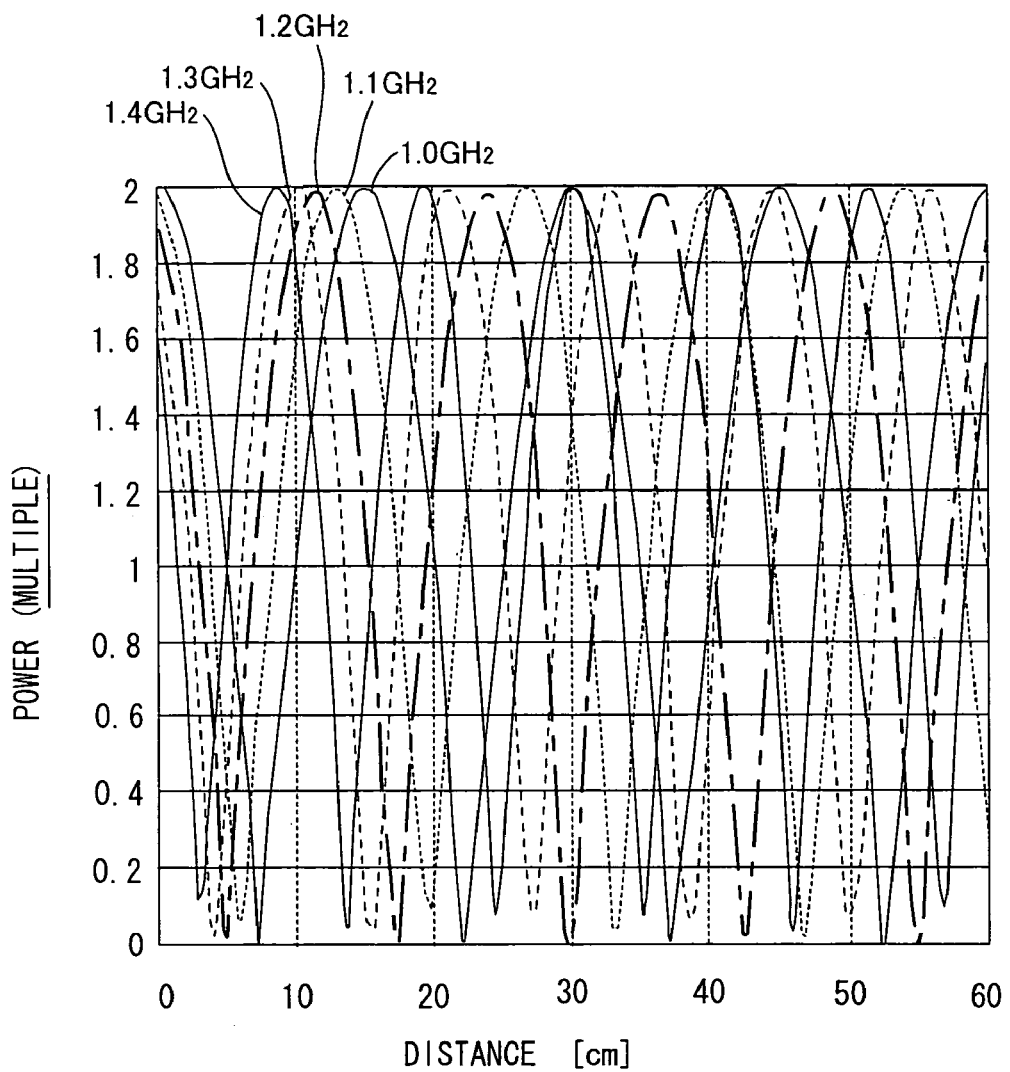
FIG. 22 is a P-r curve illustrating power P at a position at distance r while frequency of a high-frequency signal is varied.
FIG. 23 is a correspondence table illustrating correspondence between frequency f and distance r to a power peak point.

FIG. 22 is a characteristic curve (P-r curve) illustrating power P at a position at the distance r in a case where the frequency of the high-frequency signal is varied from 1 to 1.4 GHz in steps of 0.1 GHz when d3=75 cm holds and the wavelength of the signal at f=1 GHz is 30 cm. It will be understood that as the frequency decreases, a peak point at which power is maximized is shifted rightward. That is, it will be appreciated that power is being supplied only to a tag that is limited with respect to the prescribed frequency of the high-frequency signal. Accordingly, the correspondence between frequency f and distance r (cm) to the power peak point is calculated and tabulated in the manner shown in FIG. 23 and the table is provided in the read control unit 11 beforehand. The read control unit 11 finds the frequency that corresponds to the distance r to the read-target tag from the table and performs a frequency conversion. As a result, power can be supplied to the read-target tag efficiently and control data can be sent to the read-target tag reliably. Further, a high-frequency signal that has been modulated by information read from the memory of the read-target tag is input to the read control unit 11 via the antennas 14, 15 and hybrid 12. It should be noted that although the table of FIG. 23 has been created in such a manner that frequency is varied at intervals of 0.1 GHz, the table can also be created by varying frequency more finely. Further, the frequency can be tabulated in correspondence with the particular number of the read-target tag.

Figure 24:
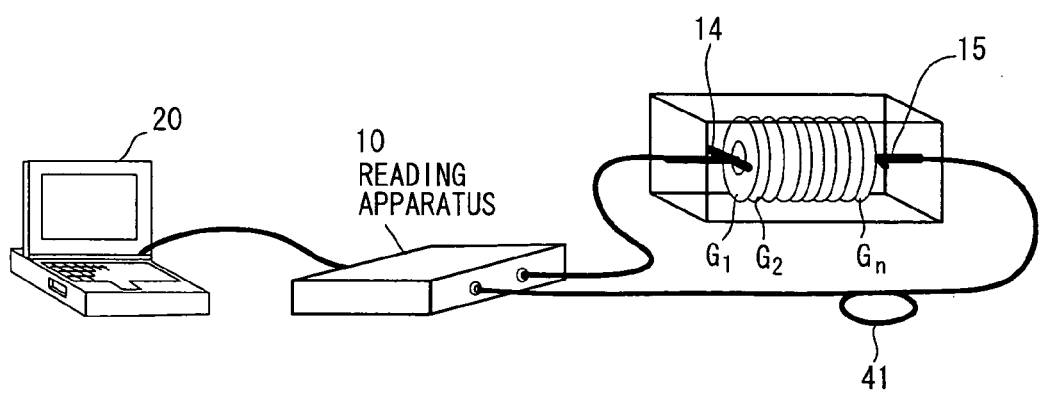
FIG. 24 is a diagram of an overall system having a tag reading apparatus according to the fourth embodiment.

FIG. 24 is a diagram of an overall system having a tag reading apparatus according to the fourth embodiment. In accordance with a command from the personal computer 20, the reading apparatus 10 reads information from an RF tag affixed to an article Gi (e.g., a compact disc) and inputs the read information to the personal computer 20.

Figure 25:
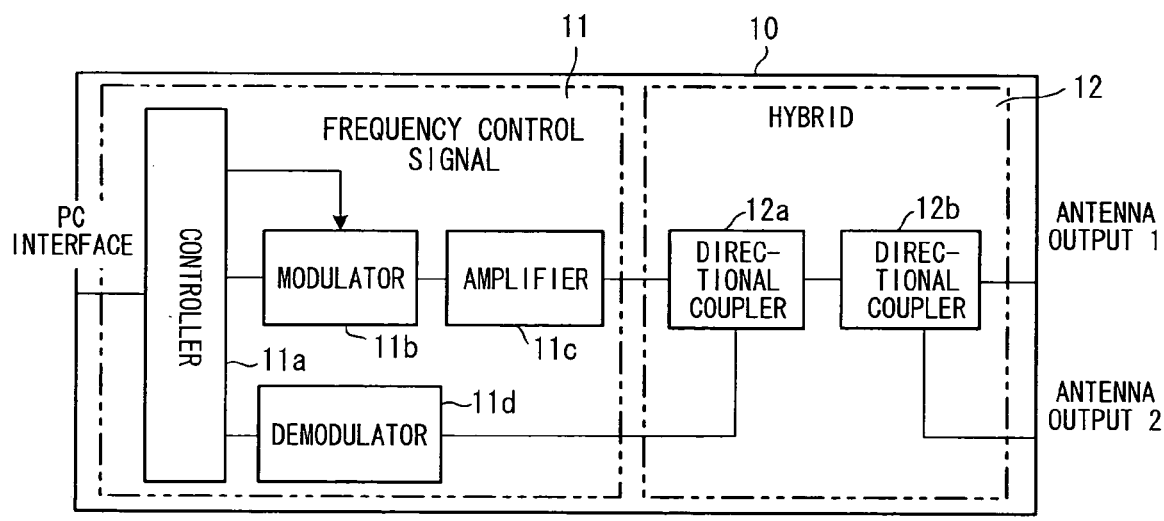
FIG. 25 is a block diagram of the tag reading apparatus shown in FIG. 24.

FIG. 25 is a block diagram of the tag reading apparatus 10 shown in FIG. 24. The apparatus includes the read control unit 11 and the hybrid 12. In response to a control signal from the personal computer 20, the controller 11a carries out anti-collision control, tag-ID reading control, data transceive control for implementing the protocol, and frequency control, etc. The modulator 11b modulates a carrier by transmit data and frequency-converts the modulated carrier signal to a high-frequency signal whose frequency is specified by the controller 11a. The amplifier 11c amplifies the high-frequency signal and inputs the amplified signal to the first directional coupler 12a in the hybrid 12. The first directional coupler 12a outputs the high-frequency signal to the antenna side (to the second directional coupler 12b). The second directional coupler 12b branches the entered high-frequency signal into two high-frequency signals and inputs one high-frequency signal to the antenna 14 and the other high-frequency signal to the antenna 15 via the coaxial cable 41 to impart the phase difference θ. On the other hand, a high-frequency signal transmitted from an RF tag is received by the antennas 14, 15 and is input to the demodulator 11d via the directional couplers 12b and 12a in the order mentioned. The demodulator 11*d* demodulates the information read from the RF tag and inputs the information to the controller 11*a*.

The article group is not enclosed by a metal case in the description rendered above. However, it can be so arranged that the article group is enclosed within the metal case MTC in the manner illustrated in FIGS. 7 and 8.

Thus, in accordance with the fourth embodiment, power, which is produced by a high-frequency signal, is supplied to each tag by generating electromagnetic waves from both sides of superimposed tags by the high-frequency signal and causing the electromagnetic waves to interfere on the tags, the high-frequency signal is branched, and a difference d3 in propagation length is imparted between propagation lengths from the branch point to points at which respective ones of the electromagnetic waves are generated. When the frequency of the high-frequency signal is changed from any low frequency fmin to any high frequency fmax, the difference d3 is decided in such a manner that the phase difference θ between the branched high-frequency signals is rotated through a required angle, and the frequency of the high-frequency signal is controlled in accordance with the position of a tag from which information is read. As a result, power can be supplied efficiently to an RF tag from which information is to be read and information can be sent and received reliably between RF tags and the tag reading apparatus.

(F) Fifth Embodiment

Figure 26:
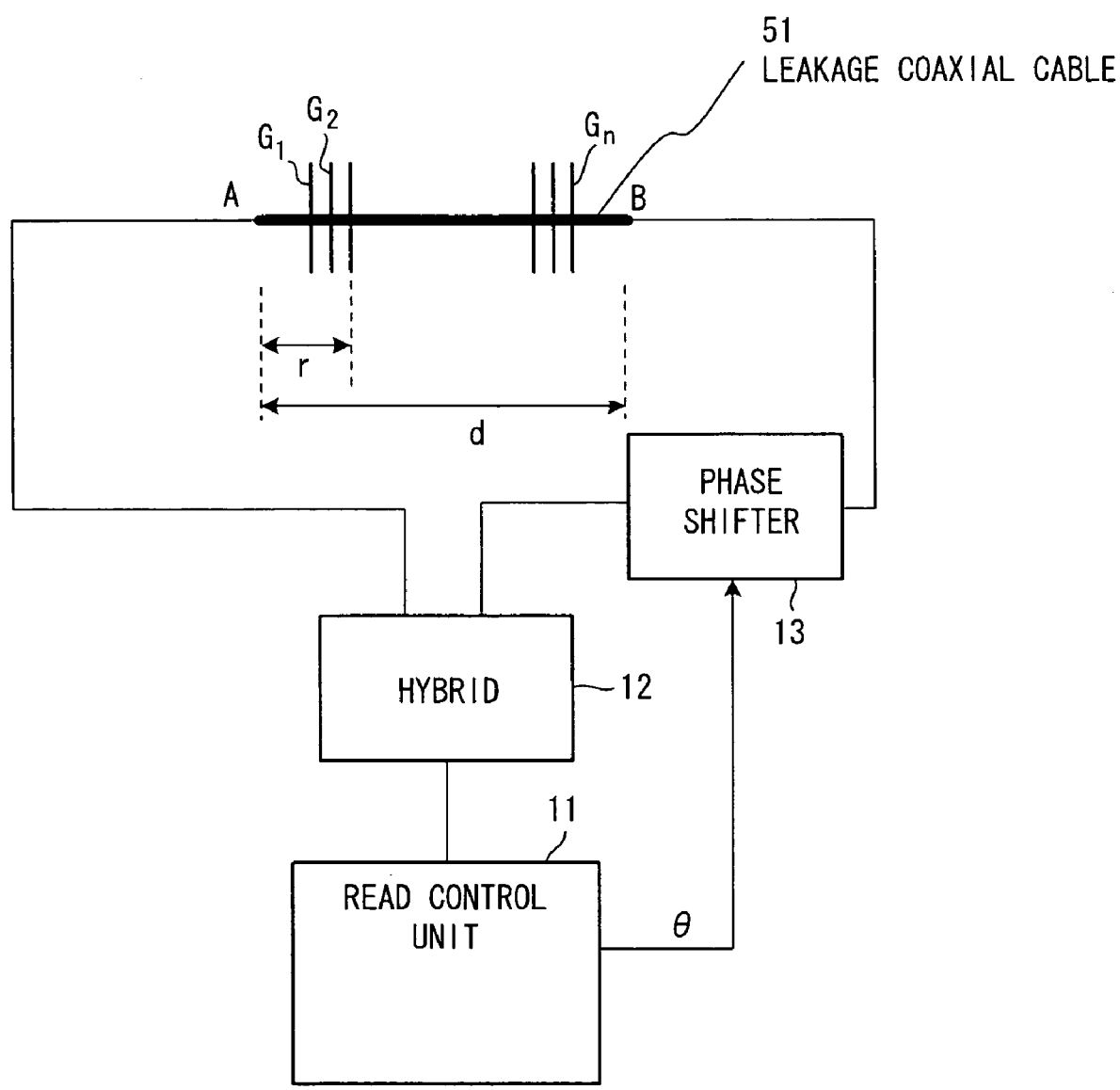
FIG. 26 is a diagram useful in describing a fifth embodiment of the present invention.

FIG. 26 is a diagram useful in describing a fifth embodiment of the present invention, in which components identical with those of the first embodiment of FIG. 1 are designated by like reference characters. The embodiment differs from the first embodiment of FIG. 1 in that (1) the antennas 14, 15 are deleted and instead a transmission line (a leakage coaxial cable) 51 of length d from which electromagnetic waves leak is placed in parallel to the direction along which the articles Gi (i=1 to n) are superimposed, and (2) high-frequency signals between which the phase difference θ is imparted are input to respective ends of the leakage coaxial cable 51 to thereby cause the signals to interfere and produce standing waves, and electromagnetic waves leak from the leakage coaxial cable and supply power to the RF tags.

The theory of standing-wave generation is the same as in the first embodiment and Equations (1), (2) hold. The read control unit 11 decides a phase shift quantity θ based upon the position of a tag from which information is to be read and inputs θ to the phase shifter 13 in a manner similar to that of the first embodiment.

Figure 27:
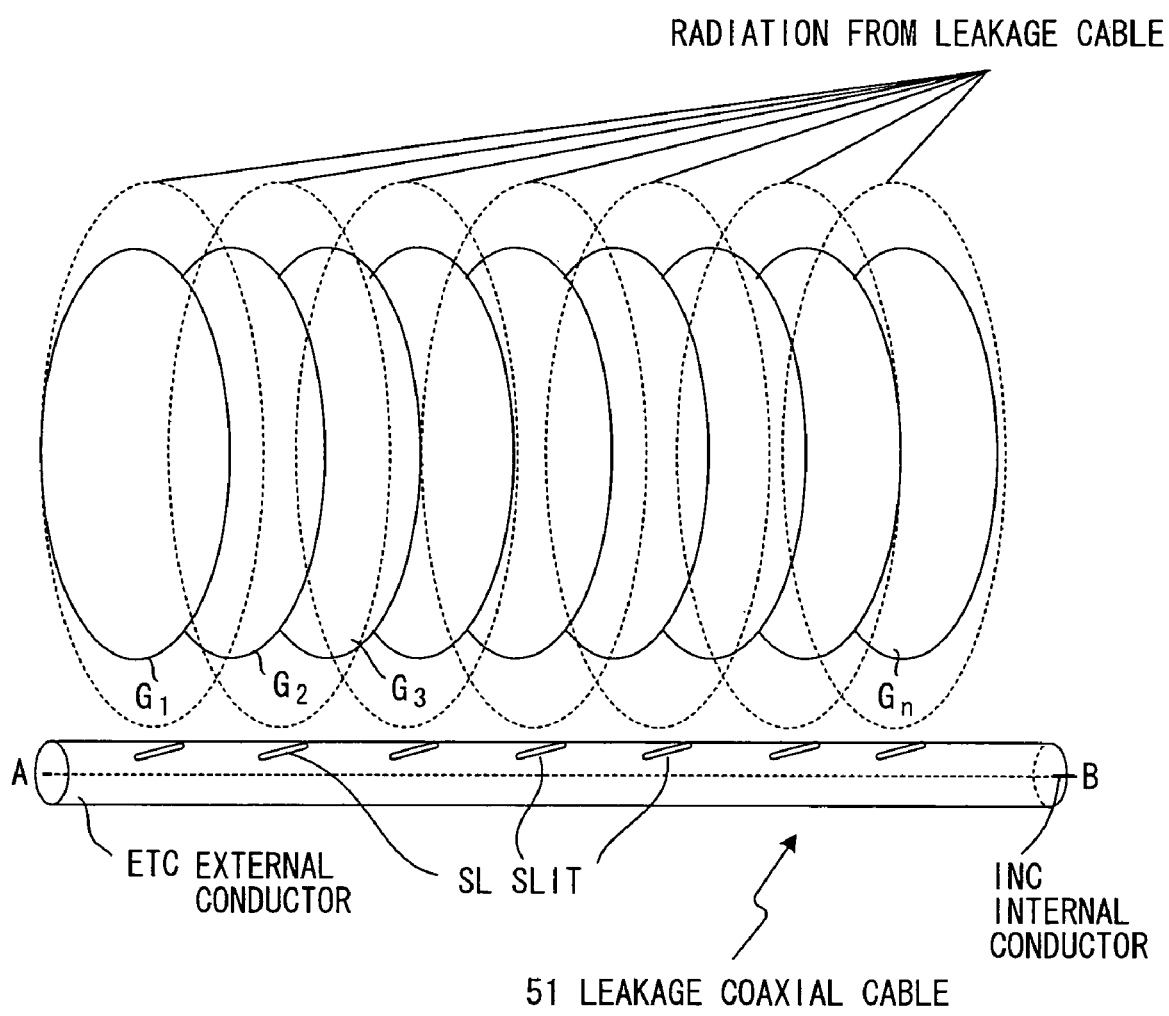
FIG. 27 is a diagram useful in describing a leakage coaxial cable.

The leakage coaxial cable 51 is one generally available on the market. As shown in FIG. 27, a coaxial cable has an external conductor ETC provided with slits SL at prescribed intervals and an internal conductor INC from both ends of which high-frequency signals are input and interfere within the cable to produce standing waves. Some of the standing waves (electromagnetic waves) emanate from the slits SL and irradiate the RF tags. FIG. 27 illustrates the manner in which the electromagnetic waves emanate from the slits SL and irradiate RF tags that have been affixed to superimposed articles G1 to Gn.

Figure 28:
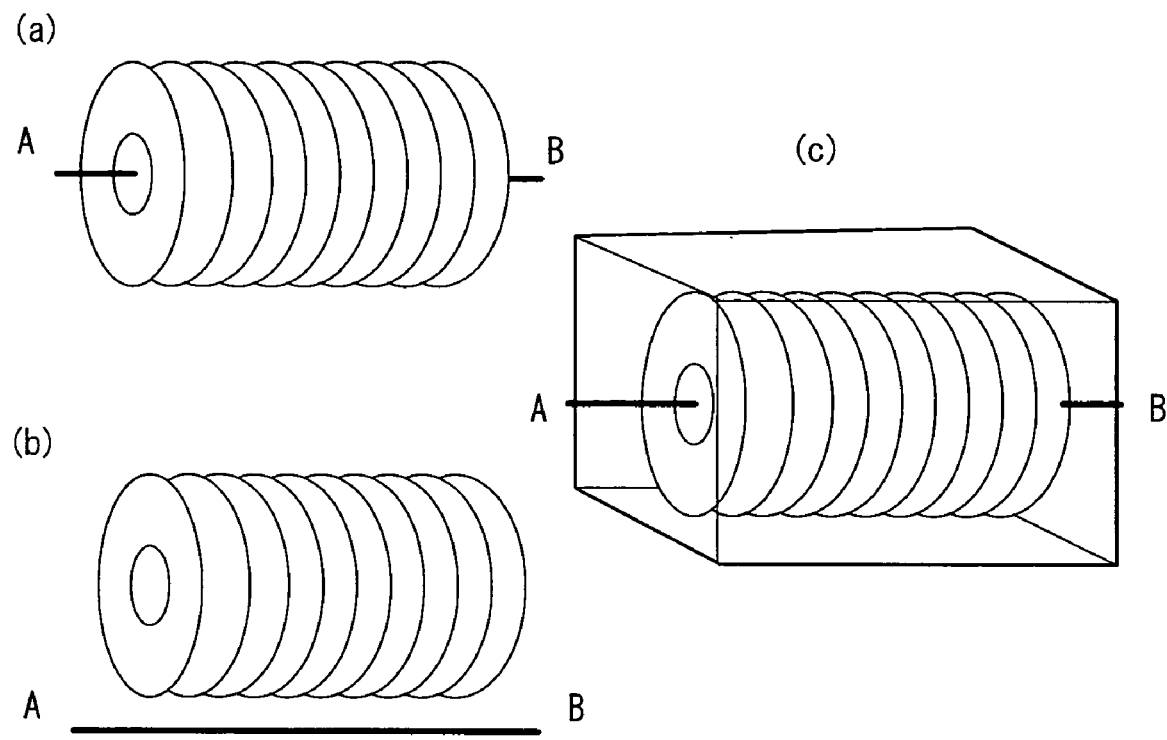
FIG. 28 illustrates examples of arrangements of leakage coaxial cables.

FIG. 28 illustrates examples of arrangements of the leakage coaxial cable 51, in which (a) shows an example where the cable 51 is passed through holes formed in the articles Gi, (b) an example where the cable 51 is disposed outside the articles Gi in parallel therewith and in close proximity to the articles, and (c) an example where the cable 51 is passed through holes formed in the articles Gi housed within a metal case.

Figure 29:
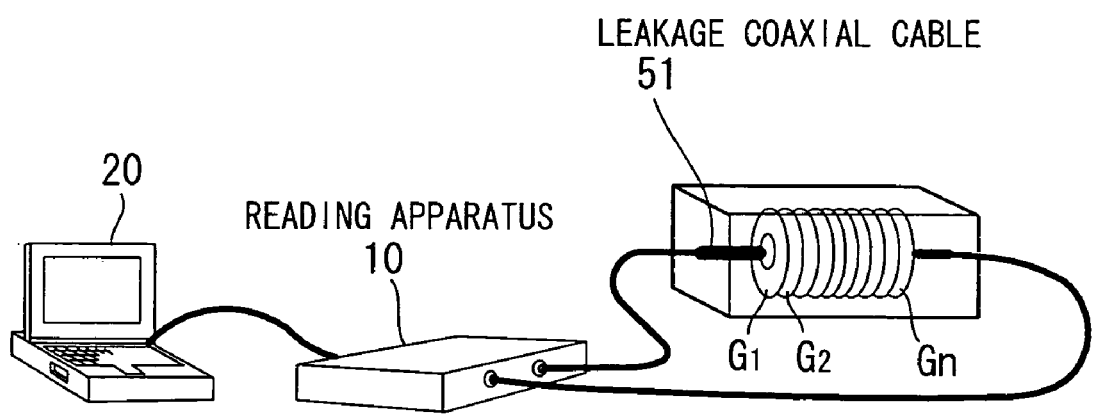
FIG. 29 is a diagram of an overall system having a tag reading apparatus according to the fifth embodiment.

FIG. 29 is a diagram of an overall system having a tag reading apparatus according to the fifth embodiment. In accordance with a command from the personal computer 20, the reading apparatus 10 reads information from an RF tag affixed to an article Gi (e.g., a compact disc) and inputs the read information to the personal computer 20. The reading apparatus 10 has a structure similar to that of the first embodiment.

Modification

Figure 30:
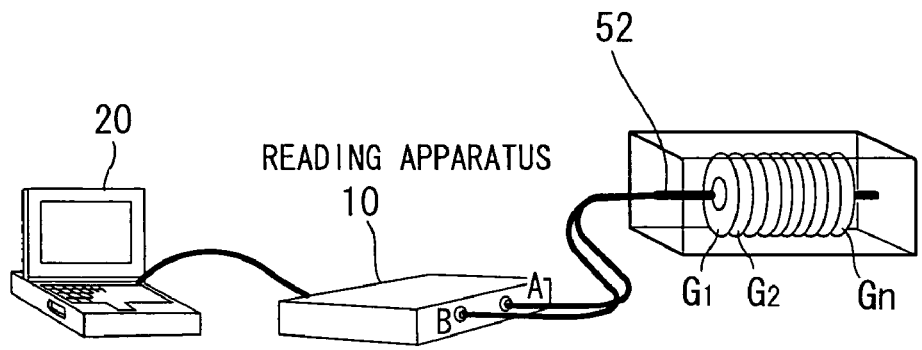
FIG. 30 is a diagram illustrating the overall configuration of a system according to a modification of the fifth embodiment.
Figure 31:
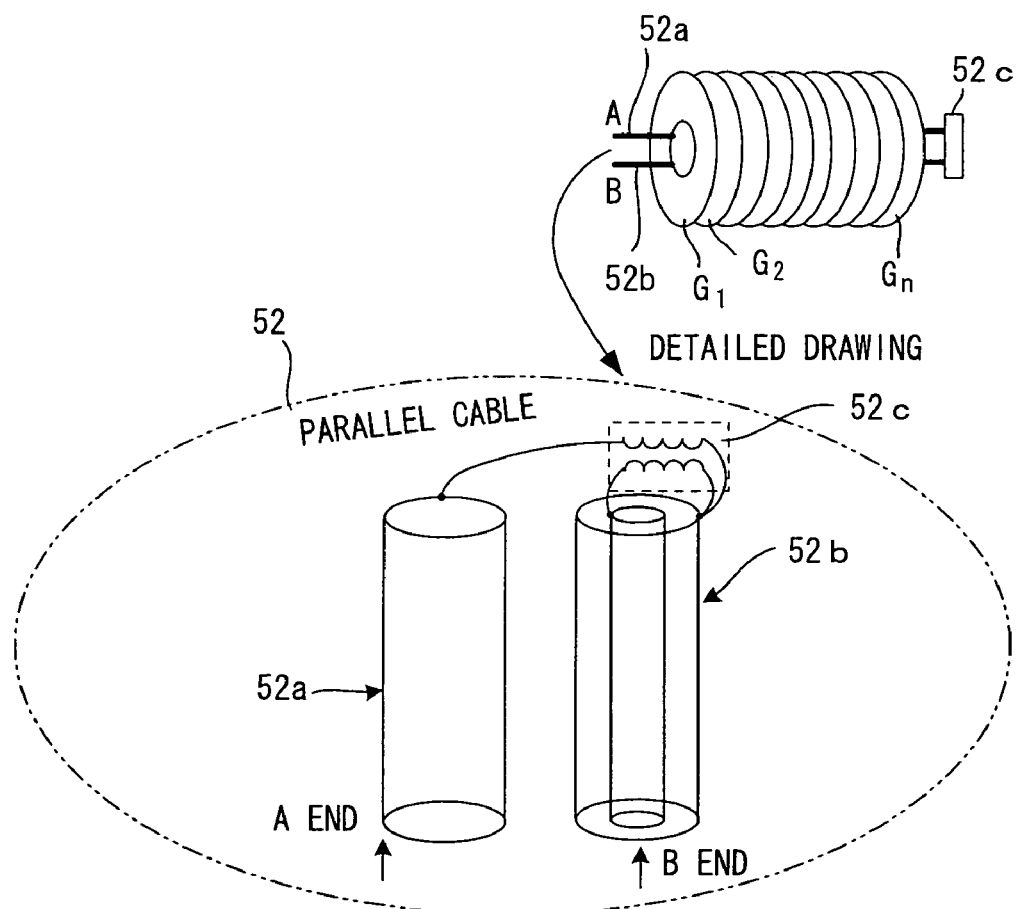
FIG. 31 illustrates an example of the structure of parallel cables.

FIG. 30 is a diagram of an overall system according to a modification of the fifth embodiment. Here components identical with those of the fifth embodiment are designated by like reference characters. This modification differs in that a parallel cable 52 is used instead of the leakage coaxial cable 51 and high-frequency signals are input to both ends of the parallel cable 52 from one side of the articles. As shown in FIG. 31, the parallel cable 52 includes a parallel line 52*a* and a coaxial cable 52*b* disposed in parallel with each other, and a coupling coil 52*c*. The parallel line (the external conductor of a coaxial cable) 52*a* is connected to a primary-side coil of the coupling coil 52*c*, the internal conductor of the coaxial cable 52*b* is connected to a secondary-side coil of the coupling coil 52*c*, the other ends of the primary- and secondary-side coils are connected to the external conductor of the coaxial cable 52*b*, and high-frequency signals are applied from an A end of the external conductor of parallel line 52*a* and from a B end of the internal conductor of coaxial cable 52*b*.

Figure 32:
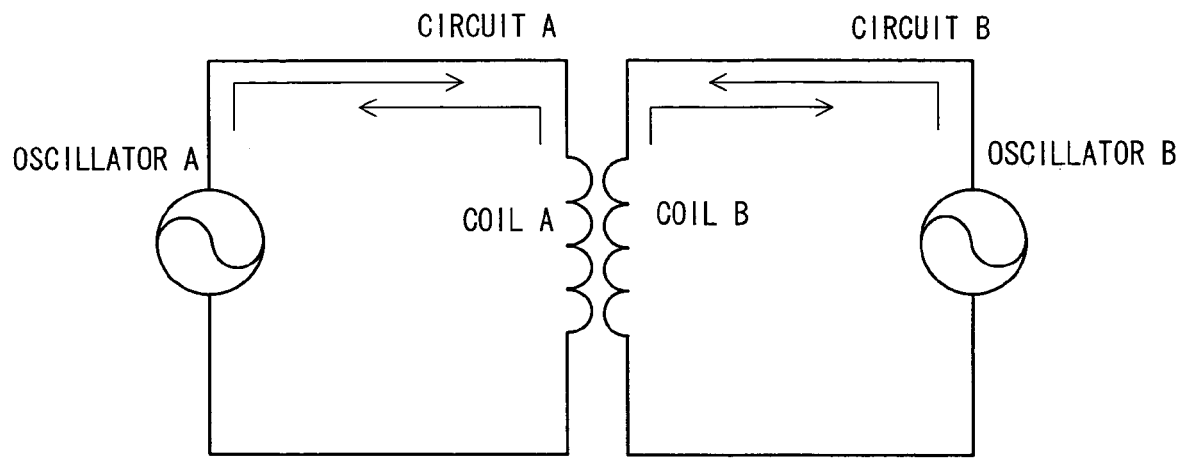
FIG. 32 illustrates an equivalent circuit of a parallel cable for describing the principle according to which a standing wave is generated.

FIG. 32 illustrates an equivalent circuit of the parallel cable 52 and is for describing the principle according to which a standing wave is generated from the parallel cable of FIG. 31. A circuit A is constituted by a high-frequency signal source at the A-end input of FIG. 31, the parallel line 52*a* and the primary-side coil of the coupling coil 52*c*, and a circuit B is constituted by a high-frequency signal source at the B-end input of FIG. 31, the coaxial cable 52*b* and the second-side coil of the coupling coil 52*c*.

The circuit A is connected to the circuit B by coupling between coils A and B. Similarly, the circuit B is connected to the circuit A by coupling between coils A and B. Since the circuits A and B are interconnected by such coil coupling, high-frequency signals from oscillators A and B are produced as indicated by the arrows in FIG. 32. As a result, interference occurs and standing waves are produced.

Thus, if the A terminal of parallel cable 52 (FIG. 31) is connected to a high-frequency output terminal A of the reading apparatus 10 (see FIG. 30) and the B terminal of the parallel cable 52 is connected to an output terminal B of phase shifter in the reading apparatus 10, then the arrangement will operate in a manner similar to that of the fifth embodiment. Furthermore, it is assumed that the coils A and B terminate the parallel line (circuit A) and coaxial cable (circuit B) by the characteristic impedance of the parallel line and the characteristic impedance of the coaxial cable, respectively.

In accordance with the fifth embodiment, a transmission line along which there is leakage of electromagnetic waves is placed at the periphery of superimposed tags, a high-frequency signal is caused to branch into high-frequency signals that are input to respective ones of both ends of the transmission line to thereby cause the signals to interfere, the phase difference between the branched high-frequency signals is controlled in accordance with the position of a tag from which information is read out, and electromagnetic waves are caused to leak from the transmission line to thereby supply power, which is produced by the high-frequency signal, to the tag. As a result, power can be supplied efficiently to an RF tag from which information is to be read and information can be sent and received reliably between RF tags and the tag reading apparatus.

(G) Sixth Embodiment

Figure 33:
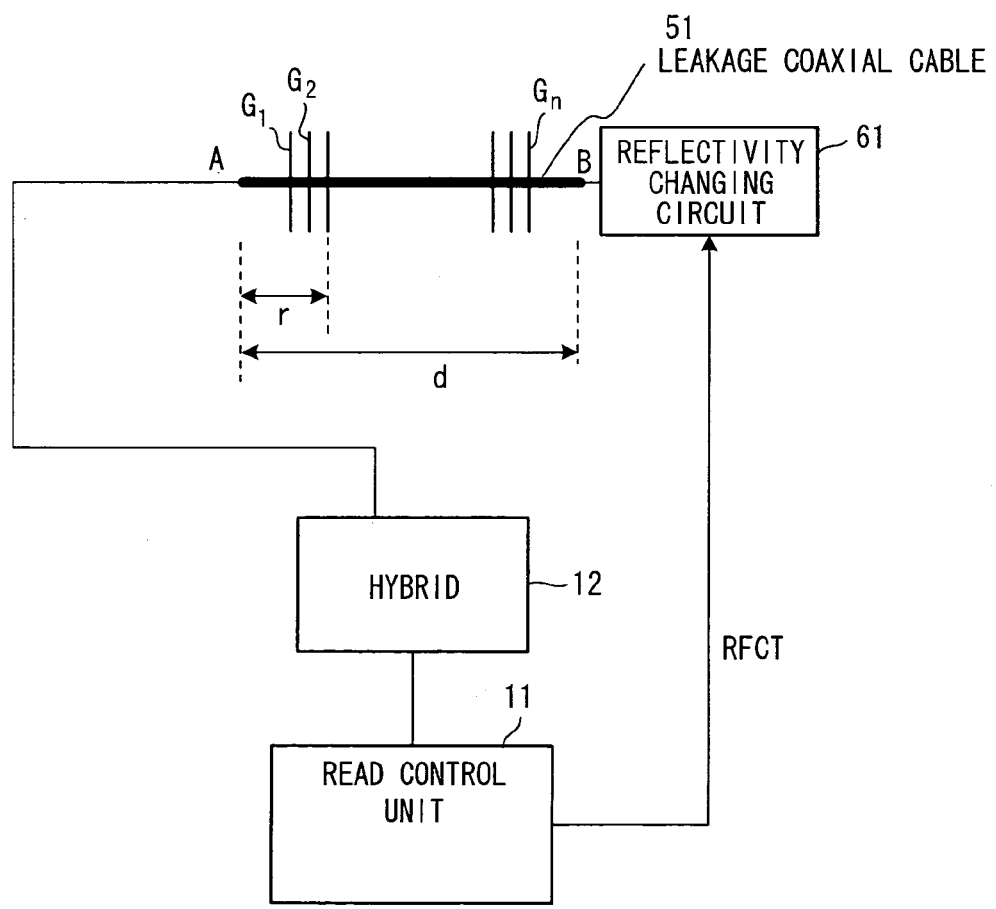
FIG. 33 is a diagram useful in describing a sixth embodiment of the present invention.
Figure 34:
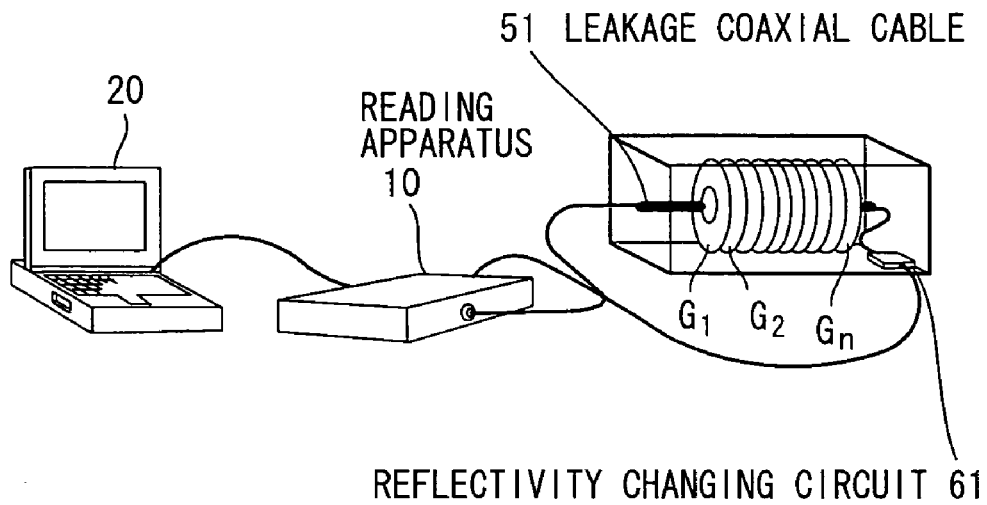
FIG. 34 is a diagram illustrating the overall configuration of a system according to this embodiment.

FIG. 33 is a diagram useful in describing a sixth embodiment of the present invention and FIG. 34 is a diagram illustrating the overall configuration of a system according to this embodiment. Components identical with those of the fifth embodiment (FIGS. 26 and 29) are designated by like reference characters. This embodiment differs from the fifth embodiment in that the phase shifter 13 is deleted and a reflectivity changing circuit 61 is instead connected to the other end of the leakage coaxial cable 51, the read control unit 11 obtains the reflectivity based upon the position of an RF tag from which information is to be read and inputs a reflectivity control signal RFCT to the reflectivity changing circuit 61. The structure of the reading apparatus 10, which is shown in FIG. 34, is the same as that illustrated in FIG. 18.

Figure 35:
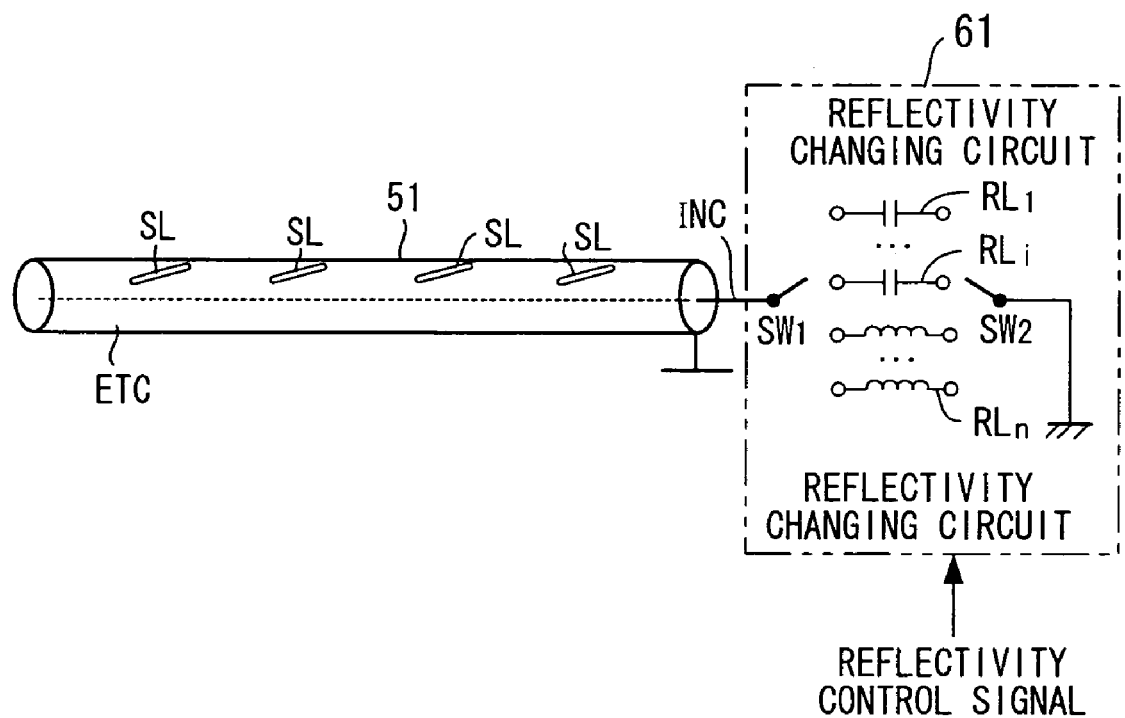
FIG. 35 illustrates an example in which a reflectivity changing circuit has been connected to a leakage coaxial cable.

FIG. 35 illustrates an example in which the reflectivity changing circuit 61 has been connected to the leakage coaxial cable 51. Here the reflectivity changing circuit 61 comprises switches SW1, SW2 and a plurality of different reluctance elements RLi.

The theory of standing-wave generation is the same as in the fifth embodiment and Equations (1), (2) hold. That is, power at the distance r from the antenna 14 can be expressed by Expression (1). In order to enlarge the standing waves at the position located at the distance r, it will suffice to decide θ so as to maximize Expression (1) and reflectivity should be controlled in accordance with Equation (2). If the reflectivity changing circuit 61 of FIG. 35 has been connected to the leakage coaxial cable 51, the real part of the impedance is zero and the size of the reflection coefficient is 1 (full reflection). The phase θ is given by Equation (5).

Accordingly, it will suffice to decide the reluctance X (L or C) that satisfies Equation (5) from the relationship between r and θ in FIG. 3 of the first embodiment and provide the controller 11a with an X-r correspondence table instead of the θ-r correspondence table. It should be noted that the table can also be created by varying the value of X more finely. Further, the reluctance value (reluctance element) can be tabulated in accordance with the particular tag number of the read-target tag.

In accordance with the sixth embodiment, a transmission line along which there is leakage of electromagnetic waves is placed at the periphery of superimposed tags, a high-frequency signal is input to one end of the transmission line, a reflecting circuit for reflecting the high-frequency signal is connected to the other end of the transmission line, the reflectivity of the reflecting circuit is controlled in accordance with the position of a tag from which information is read, the high-frequency signal and the reflected high-frequency signal interfere with each other and electromagnetic waves are caused to leak from the transmission line to thereby supply power, which is produced by the high-frequency signal, to the desired tag. As a result, power can be supplied efficiently to an RF tag from which information is to be read and information can be sent and received reliably between RF tags and the tag reading apparatus.

(H) Seventh Embodiment

Figure 36:
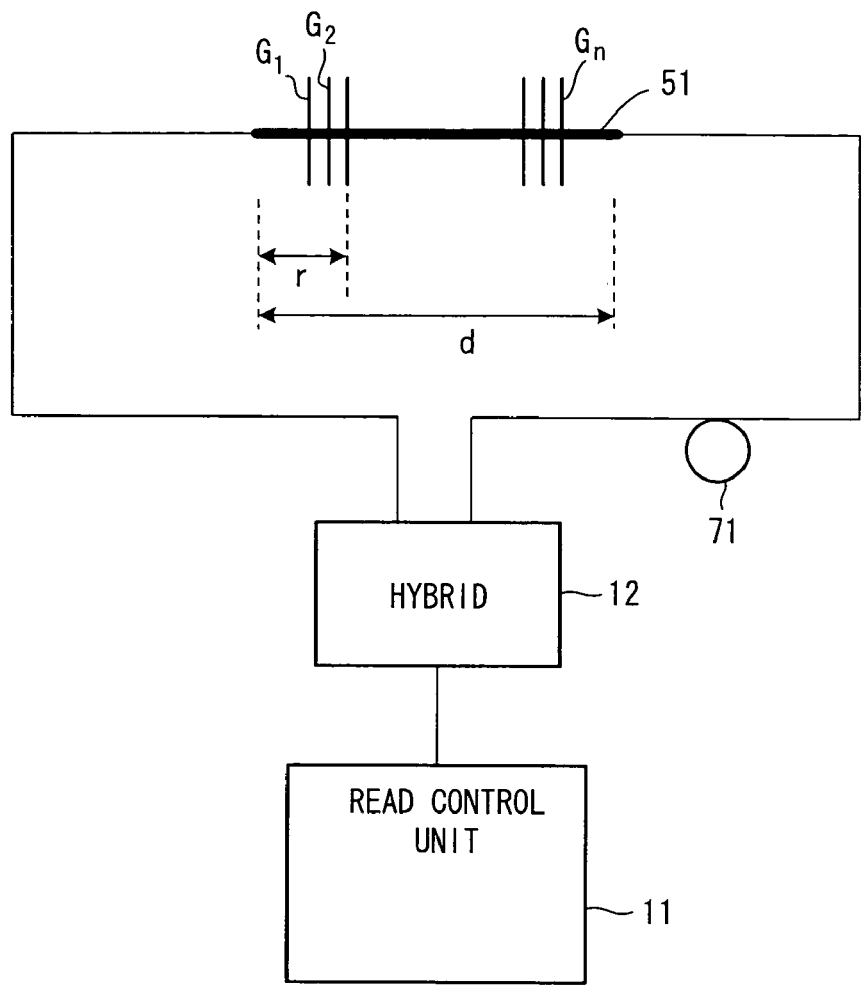
FIG. 36 is a diagram useful in describing a seventh embodiment of the present invention.
Figure 37:
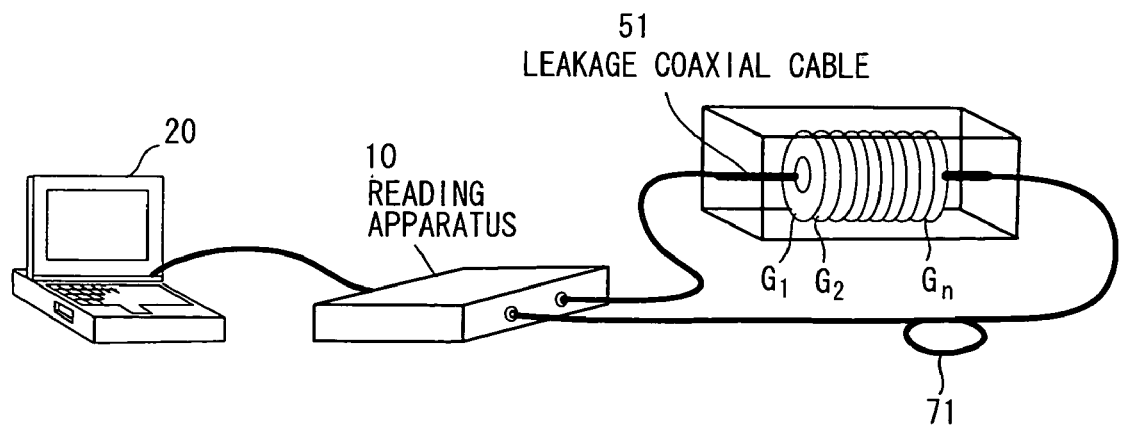
FIG. 37 is a diagram illustrating the overall configuration of a system according to this embodiment.

FIG. 36 is a diagram useful in describing a seventh embodiment of the present invention and FIG. 37 is a diagram illustrating the overall configuration of a system according to this embodiment. Components identical with those of the fifth embodiment are designated by like reference characters. This embodiment differs from the fifth embodiment in that the phase shifter 13 is deleted and the apparatus is instead provided with a coaxial cable 71 of length d3, which adjusts line length, inserted between the hybrid 12 and the terminus of leakage coaxial cable 51. In the fifth embodiment, the phase shifter 13 furnishes a phase difference between the high-frequency signals input to respective ones of both ends of the leakage coaxial cable 51. In the seventh embodiment, however, the lengths of the transmission lines from the hybrid (branch point) 12 to both ends of the leakage coaxial cable 51 are provided with a difference in length, a phase difference is produced by this difference in length and the phase difference is adjusted and controlled by changing the frequency of the high-frequency signal. The method of controlling phase is the same as that of the fourth embodiment.

In accordance with the seventh embodiment, a transmission line along which there is leakage of electromagnetic waves is placed at the periphery of superimposed tags, a high-frequency signal is caused to branch into high-frequency signals that are input to respective ones of both ends of the transmission line to thereby cause the signals to interfere, and a difference is propagation length is imparted between propagation lengths from the branch point to both ends of the transmission line. When the frequency of the high-frequency signal is changed from any low frequency to any high frequency, the difference in propagation length is decided in such a manner that the phase difference θ between the branched high-frequency signals is rotated through a required angle, the frequency of the high-frequency signal is controlled in accordance with the position of a tag from which information is read, and electromagnetic waves are caused to leak from the transmission line to thereby supply power, which is produced by the high-frequency signal, to the RF tag. As a result, power can be supplied efficiently to an RF tag from which information is to be read and information can be sent and received reliably between RF tags and the tag reading apparatus.

As many apparently widely different embodiments of the present invention can be made without departing from the spirit and scope thereof, it is to be understood that the invention is not limited to the specific embodiments thereof except as defined in the appended claims.

What is claimed is:

1. A tag reading method for supplying power to at least one of a plurality of superimposed tags and reading information from the tag, comprising the steps of:

supplying power, which is produced by high-frequency signals, to each tag by generating electromagnetic waves from a plurality of locations by the high-frequency signals and causing the electromagnetic waves to interfere on the tags; and controlling a phase difference between the high-frequency signals in accordance with the position of a tag from which information is read so as to increase the power.

2. The method according to claim 1, wherein electromagnetic waves are generated from both sides of the superimposed tags by the high-frequency signals and the electromagnetic waves are caused to interfere on the tags.

3. The method according to claims 1, wherein a plurality of the superimposed tags are enclosed by a metal body.

4. A tag reading method for supplying power to at least one of a plurality of superimposed tags and reading information from the tag, comprising the steps of:

supplying power, which is produced by a high-frequency signal, to each tag from one side of the superimposed tags;

placing a reflector, which reflects electromagnetic waves produced by the high-frequency signal, on the other side of the tags;

causing the electromagnetic wave and the reflected electromagnetic wave to interfere with each other on the superimposed tags; and controlling the position of the reflector in accordance with the position of a tag from which information is read so as to increase the power.

5. A tag reading method for supplying power to at least one of a plurality of superimposed tags and reading information from the tag, comprising the steps of:

supplying power, which is produced by a high-frequency signal, to each tag from one side of the superimposed tags;

placing a reflector, which reflects electromagnetic waves produced by the high-frequency signal, on the other side of the tags;

causing the electromagnetic wave and the reflected electromagnetic wave to interfere with each other on the superimposed tags; and controlling reflectivity of the reflector in accordance with the position of a tag from which information is read.

6. A tag reading method for supplying power to at least one of a plurality of superimposed tags and reading information from the tag, comprising the steps of:

supplying power, which is produced by a high-frequency signal, to each tag by generating electromagnetic waves from a plurality of locations by the high-frequency signal and causing the electromagnetic waves to interfere on the tags;

causing the high-frequency signal to branch at a branch point;

imparting a difference in propagation length between propagation lengths from the branch point to points at which respective ones of the electromagnetic waves are generated;

when the frequency of the high-frequency signal is changed from a low frequency to a high frequency, deciding the difference in propagation length in such a manner that a phase difference between the branched high-frequency signals is rotated by a required angle; and controlling the frequency of the high-frequency signal in accordance with the position of a tag from which information is read.

7. The method according to claim 6, wherein electromagnetic waves are generated from both sides of the superimposed tags byte high-frequency signals and the electromagnetic waves are caused to interfere on the tags.

8. A tag reading method for supplying power to at least one of a plurality of superimposed tags and reading information from the tag, comprising the steps of:

placing a transmission line along which there is leakage of electromagnetic waves at the periphery of the superimposed tags;

causing a high-frequency signal to branch and inputting the branched high-frequency signals to respective ones of bath ends of the transmission line to thereby cause the signals to interfere with each other;

controlling a phase difference between the branched high-frequency signals in accordance with the position of a tag from which information is read; and causing electromagnetic waves to leak from the transmission line to thereby supply power, which is produced by the high-frequency signal, to the tag.

9. A tag reading method for supplying power to at least one of a plurality of superimposed tags and reading information from the tag, comprising the steps of:

placing a transmission line along which there is leakage of electromagnetic waves at the periphery of the superimposed tags;

inputting a high-frequency signal to one end of the transmission line and connecting a reflecting circuit, which is for reflecting the high-frequency signal, to the other end of the transmission line;

controlling reflectivity of the reflecting circuit in accordance with the position of a tag from which information is read; and causing the high-frequency signal and the reflected high-frequency signal to interfere with each other and causing electromagnetic waves to leak from the transmission line to thereby supply power, which is produced by the high-frequency signal, to the tag.

10. A tag reading method for supplying power to at least one of a plurality of superimposed tags and reading information from the tag, comprising the steps of:

placing a transmission line along which there is leakage of electromagnetic waves at the periphery of the superimposed tags;

causing a high-frequency signal to branch at a branch point and inputting the branched high-frequency signals to respective ones of both ends of the transmission line to thereby cause the signals to interfere with each other;

imparting a difference in propagation length between propagation lengths from the branch point to both ends of the transmission line;

when the frequency of the high-frequency signal is changed from a low frequency to a high frequency, deciding the difference in propagation length in such a manner that a phase difference between the branched high-frequency signals is rotated by a required angle;

controlling the frequency of the high-frequency signal in accordance with the position of a tag from which information is read; and causing electromagnetic waves to leak from the transmission line to thereby supply power, which is produced by the high-frequency signal, to the tag.

11. A tag reading apparatus for supplying power to at least one of a plurality of superimposed tags and reading information from the tag, comprising:

means for generating high-frequency signals;

electromagnetic wave generating means to which the high-frequency signals are input for generating electromagnetic waves from a plurality of locations by the high-frequency signals and causing the electromagnetic waves to interfere on the tags and to supply the power to the tags;

means for deciding a phase difference between the high-frequency signals in accordance with the position of a tag from which information is read so as to increase the power; and phase shifting means for controlling the phase of at least one high-frequency signal so as to produce the phase difference.

12. The apparatus according to claim 11, wherein electromagnetic waves are generated from both sides of the superimposed tags by the high-frequency signals and the electromagnetic waves are caused to interfere on the tags.

13. The apparatus according to claims 11, wherein a plurality of the superimposed tags are enclosed by a metal body.

14. A tag reading apparatus for supplying power to at least one of a plurality of superimposed tags and reading information from the tag, comprising:
   means for generating a high-frequency signal;
   electromagnetic wave generating means to which the high-frequency signal is input for generating electromagnetic waves from one side of the superimposed tags by the high-frequency signal;
   a reflector provided on the other side of the tags for reflecting the electromagnetic waves produced by the high-frequency signal and causing the electromagnetic waves and the reflected electromagnetic waves to interfere on the superimposed tags and to supply the power to the tags;
   moving means for moving said reflector; and
   control means for controlling the position of the reflector in accordance with the position of a tag from which information is read so as to increase the power.

15. A tag reading apparatus for supplying power to at least one of a plurality of superimposed tags and reading information from the tag, comprising:
   means for generating a high-frequency signal;
   electromagnetic wave generating means to which the high-frequency signal is input for generating electromagnetic waves from one side of the superimposed tags by the high-frequency signal;
   a reflector provided on the other side of the tags for reflecting the electromagnetic waves produced by the high-frequency signal and causing the electromagnetic waves and the reflected electromagnetic waves to interfere on the superimposed tags;
   reflectivity changing means for changing reflectivity of said reflector; and
   control means for controlling reflectivity of said reflector in accordance with the position of a tag from which information is read.

16. A tag reading apparatus for supplying power to at least one of a plurality of superimposed tags and reading information from the tag, comprising:
   means for generating a high-frequency signal;
   branching means for branching the high-frequency signal at a branch point;
   electromagnetic wave generating means for generating electromagnetic waves from a plurality of locations by the branched high-frequency signals and causing the electromagnetic waves to interfere on the tags;
   a propagation path which, when the frequency of the high-frequency signal is changed from a low frequency to a high frequency, is for imparting a difference in propagation length between propagation lengths from the signal branch point to points at which the electromagnetic waves are generated, in such a manner that a phase difference between the branched high-frequency signals is rotated by a required angle; and
   control means for controlling the frequency of the high-frequency signal in accordance with the position of a tag from which information is read.

17. The apparatus according to claim 16, wherein electromagnetic waves are generated from both sides of the superimposed tags by the high-frequency signals and the electromagnetic waves are caused to interfere on the tags.

18. A tag reading apparatus for supplying power to at least one of a plurality of superimposed tags and reading information from the tag, comprising:
   a transmission line, which is provided at the periphery of the superimposed tags, along which there is leakage of electromagnetic waves;
   means for generating a high-frequency signal;
   means for branching the high-frequency signal and inputting the branched high-frequency signals to respective ones of both ends of said transmission line;
   means for deciding a phase difference between the branched high-frequency signals based upon the position of a tag from which information is read; and
   means for controlling the phase of at least one high-frequency signal so as to produce the phase difference;
   wherein electromagnetic waves are caused to leak from said transmission line to thereby supply power, which is produced by the high-frequency signal, to the tag.

19. A tag reading apparatus for supplying power to at least one of a plurality of superimposed tags and reading information from the tag, comprising:
   a transmission line, which is provided at the periphery of the superimposed tags, along which there is leakage of electromagnetic waves;
   means for generating a high-frequency signal and inputting a high-frequency signal to one end of said transmission line;
   a reflecting circuit connected to the other end of said transmission line for reflecting the high-frequency signal; and
   means for controlling reflectivity of said reflecting circuit in accordance with the position of a tag from which information is read;
   wherein the high-frequency signal and the reflected high-frequency signal are made to interfere with each other and electromagnetic waves are caused to leak from the transmission line to thereby supply power, which is produced by the high-frequency signal, to the tag.

20. A tag reading apparatus for supplying power to at least one of a plurality of superimposed tags and reading information from the tag, comprising:
   a transmission line, which is provided at the periphery of the superimposed tags, along which there is leakage of electromagnetic waves;
   means for generating a high-frequency signal;
   means for branching the high-frequency signal at a branch point and inputting the branched high-frequency signals to respective ones of both ends of said transmission line;
   a propagation path which, when the frequency of the high-frequency signal is changed from a low frequency to a high frequency, is for imparting a difference in propagation length between propagation lengths from the signal branch point to points at which the electromagnetic waves are generated, in such a manner that a phase difference between the branched high-frequency signals is rotated by a required angle; and
   control means for controlling the frequency of the high-frequency signal in accordance with the position of a tag from which information is read.

* * * * *